United States Patent [19]
Hatouchi

[11] Patent Number: 5,090,558
[45] Date of Patent: Feb. 25, 1992

[54] SHELF APPARATUS UTILIZING ROLLERS

[75] Inventor: Gokichi Hatouchi, Komaki, Japan

[73] Assignee: Daifuku Co., Ltd., Japan

[21] Appl. No.: 589,393

[22] Filed: Sep. 27, 1990

Related U.S. Application Data

[63] Continuation-in-part of Ser. No. 280,711, Dec. 6, 1988, abandoned.

[30] Foreign Application Priority Data

| Dec. 15, 1987 | [JP] | Japan | 62-190585[U] |
| Feb. 2, 1988 | [JP] | Japan | 63-13430[U] |
| Feb. 9, 1988 | [JP] | Japan | 63-16119[U] |
| Feb. 9, 1988 | [JP] | Japan | 63-16120[U] |
| Mar. 17, 1988 | [JP] | Japan | 63-35625[U] |
| May 18, 1988 | [JP] | Japan | 63-65292[U] |
| May 18, 1988 | [JP] | Japan | 63-65293[U] |
| May 18, 1988 | [JP] | Japan | 63-65294[U] |
| Mar. 2, 1990 | [JP] | Japan | 2-21690[U] |

[51] Int. Cl.[5] .............................. B65G 13/06
[52] U.S. Cl. .................................. 198/781; 198/435
[58] Field of Search .......... 198/781, 721, 722, 718, 198/780, 790, 465.3, 435; 414/267

[56] References Cited

U.S. PATENT DOCUMENTS

| 3,409,152 | 11/1968 | Edwards | 414/267 |
| 3,545,596 | 12/1970 | Turnbough et al. | 198/721 |
| 3,960,262 | 6/1976 | Henig | 198/790 X |
| 4,174,777 | 11/1979 | Riehle | 198/790 X |
| 4,453,627 | 6/1984 | Wilkins | 198/781 |
| 4,461,382 | 7/1984 | Hoover et al. | 198/781 |
| 4,815,588 | 3/1989 | Katsuragi et al. | 198/781 |
| 4,844,231 | 7/1989 | Usui | 198/781 X |

FOREIGN PATENT DOCUMENTS 6118750 7/1983 Japan .

Primary Examiner—Robert P. Olszewski
Assistant Examiner—Cheryl L. Gastineau
Attorney, Agent, or Firm—Barnes, Kisselle, Raisch, Choate, Whittemore & Hulbert

[57] ABSTRACT

This invention relates to shelf apparatus using rollers. In a shelf frame, conveyor devices are installed in a plurality of vertically spaced stages. Each conveyor device has two rows of roller conveyors, at least one of which is capable of generating driving power for driving loads. A space is defined between the two rows of roller conveyors to make room for installing stops adapted to stop the movement of loads or operating the fork of a fork lift truck for putting loads on and out of the shelves.

8 Claims, 27 Drawing Sheets

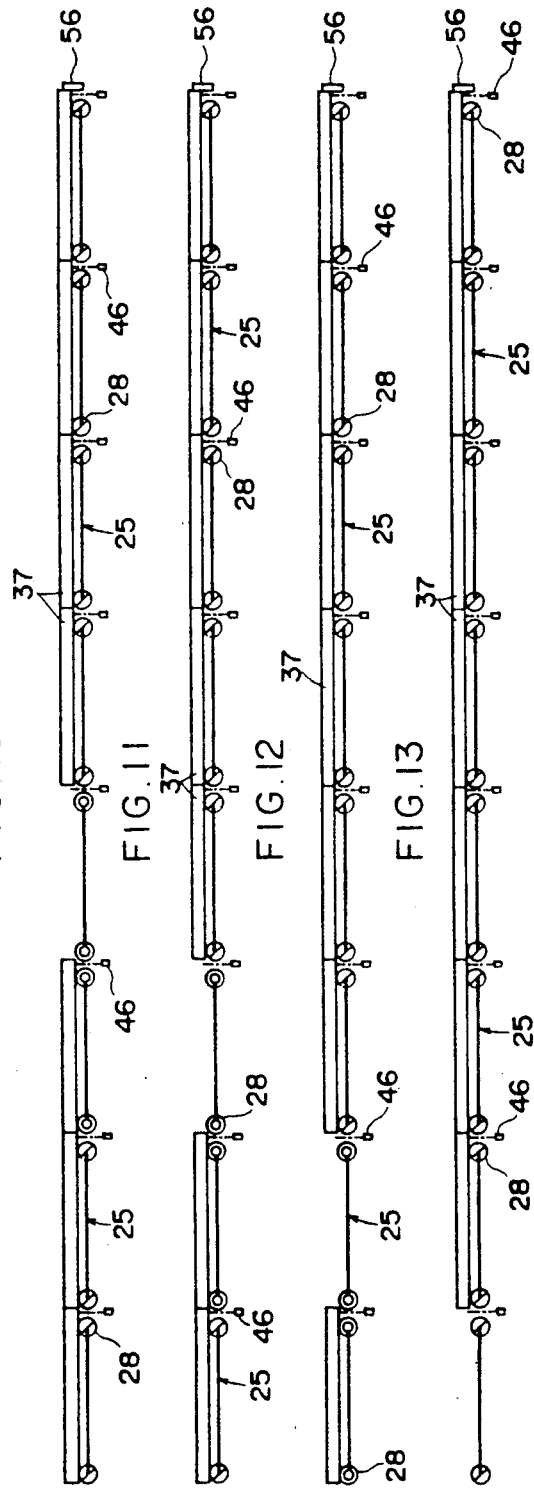
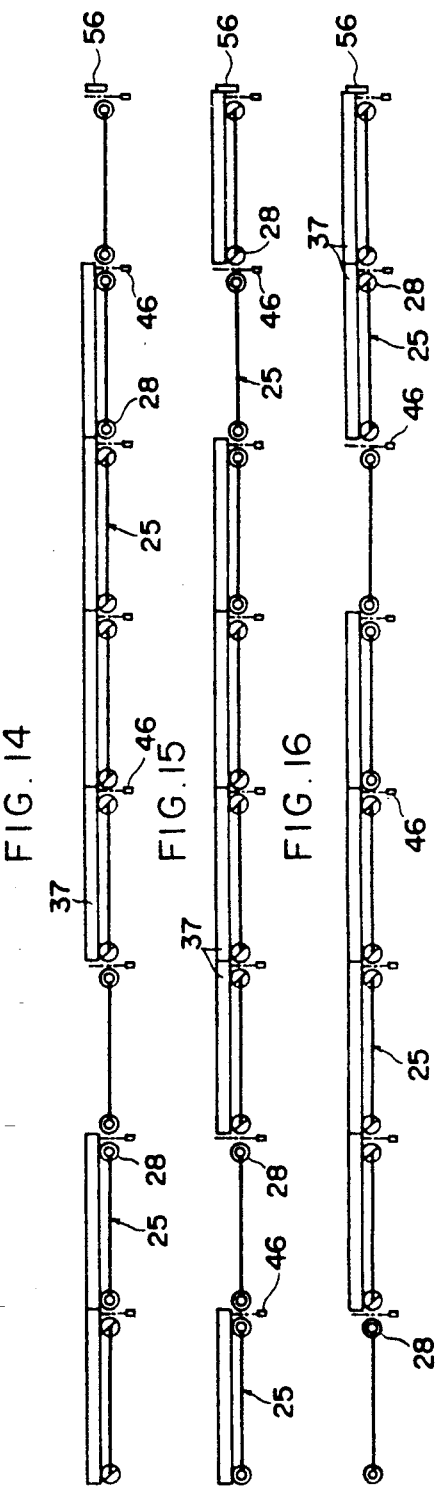

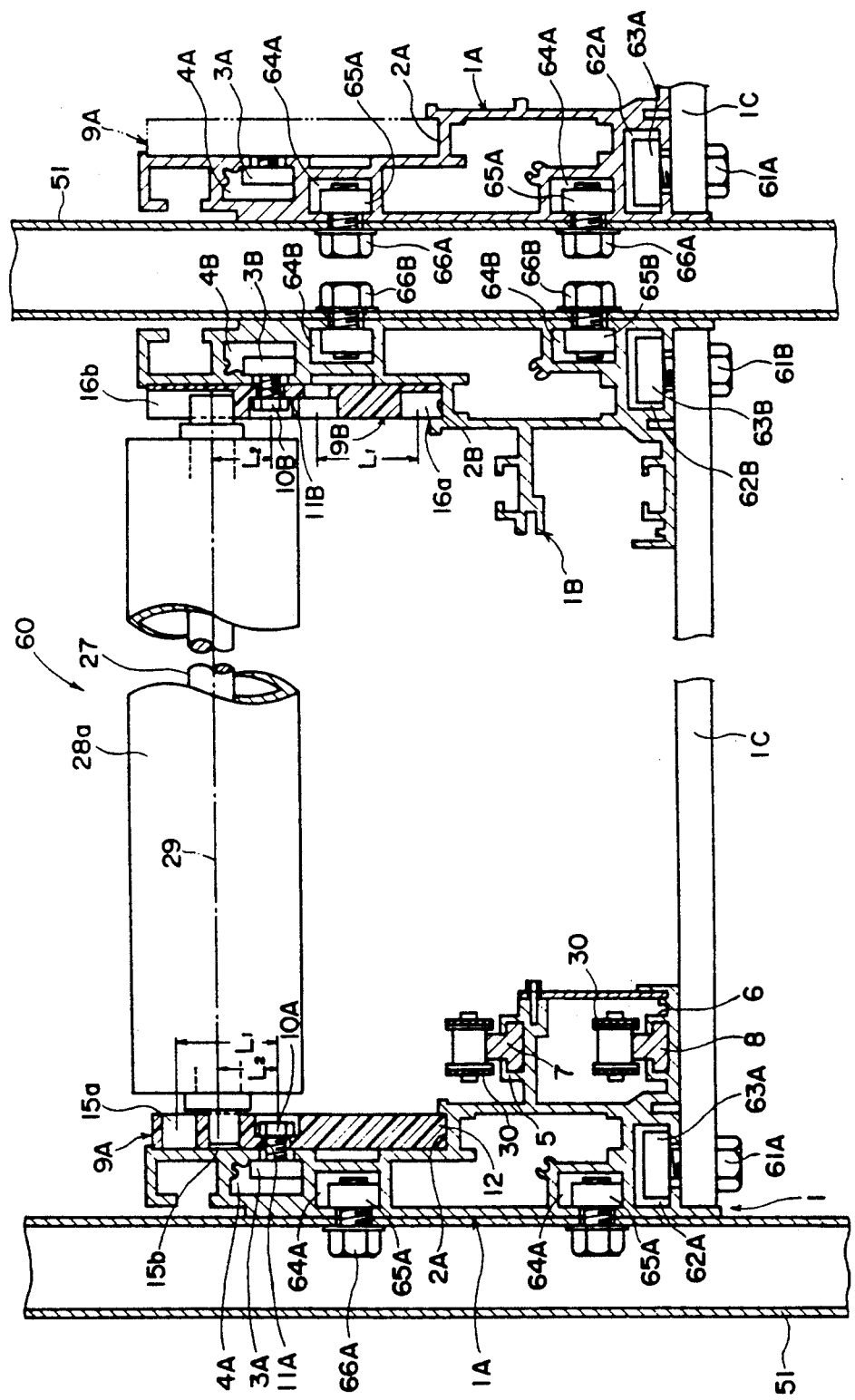

SHELF APPARATUS UTILIZING ROLLERS

This application is a continuation-in-part of my application Ser. No. 07/280,711 filed Dec. 6, 1988, now abandoned.

FIELD OF THE INVENTION

The present invention relates to a shelf apparatus using rollers, which is employed for storing loads either directly or through pallets and taking them out as needed.

BACKGROUND OF THE INVENTION

Conventionally, this kind of shelf apparatus, as found in, e.g., Japanese Utility Model publication No. 18750/1986, comprises wheel rails having a number of wheels and disposed in a plurality of vertically spaced stages in a frame, with the direction of transport (slide) being inclined. According to this conventional shelf apparatus, a load fed to on the upper region of the slope slides down on the wheels until it is stopped by a stopper installed at the lower end; thus, successively fed loads are stopped for storage by their respective preceding loads. Loads which are stored are taken out as needed from the lower region of the slope and the vacancies thus formed are filled in that succeeding loads slide down to fill such vacancies. In this conventional example, putting in and out of loads is manually effected, but in a large-sized shelf apparatus, for example, a forklift cart is used to carry in and out loads.

According to the conventional shelf apparatus as described above, transport of loads is effected by slide movement utilizing the free rotation of wheels; thus, if the free rotation of wheels fail to take place smoothly or if there is a variation in the weight of loads, the slide movement does not take place positively, lacking in reliability. Further, from the standpoint of frictional resistance, there are some pallets which cannot be employed because of the material of which they are made. It is conceivable that this can be coped with by providing a sufficient angle of inclination; however, a large angle of inclination results in the slide speed becoming high and varying, so that when a load is stopped by a stopper, a high shock is exerted; thus loads become unstable. Also, the dead space for the slope increases, resulting in inefficient storage.

DISCLOSURE OF THE INVENTION

With the above in mind, an object of the present invention is to provide a shelf apparatus using rollers, wherein the direction of transport is made horizontal and yet loads can be moved reliably at a constant speed.

To achieve this object, the invention provides a shelf apparatus using rollers comprising:
 a shelf frame,
 conveyor means having a horizontal direction of transport and installed in a plurality of vertically spaced stages within said shelf frame,
 each conveyor means having two rows of roller conveyors,
 at least one of said two roller conveyors being adapted to generate driving power for transporting loads.

According to such arrangement, only those loads which are required can be forcibly moved; thus, loads can be reliably transported all the time irrespectively of a dispersion in weight and the configuration of loads.

Further, since the roller conveyors can be arranged horizontally, it is possible to eliminate the dead space and increase the storage efficiency, as compared with the conventional shelf apparatus of inclined construction. A space can be defined between two roller conveyors to make room for installing stops or the like to stop loads or operating the fork of a fork lift truck can be operated.

BRIEF DESCRIPTION OF THE DRAWINGS

FIGS. 14 through 16 are schematic side views showing another example of the operating state of the roller conveyor in the first embodiment;

FIG. 17 is a front view, in section, showing a non-driven type free roller of a roller conveyor in a shelf apparatus using rollers according to a second embodiment:

DESCRIPTION OF THE EMBODIMENTS

Figure 1:
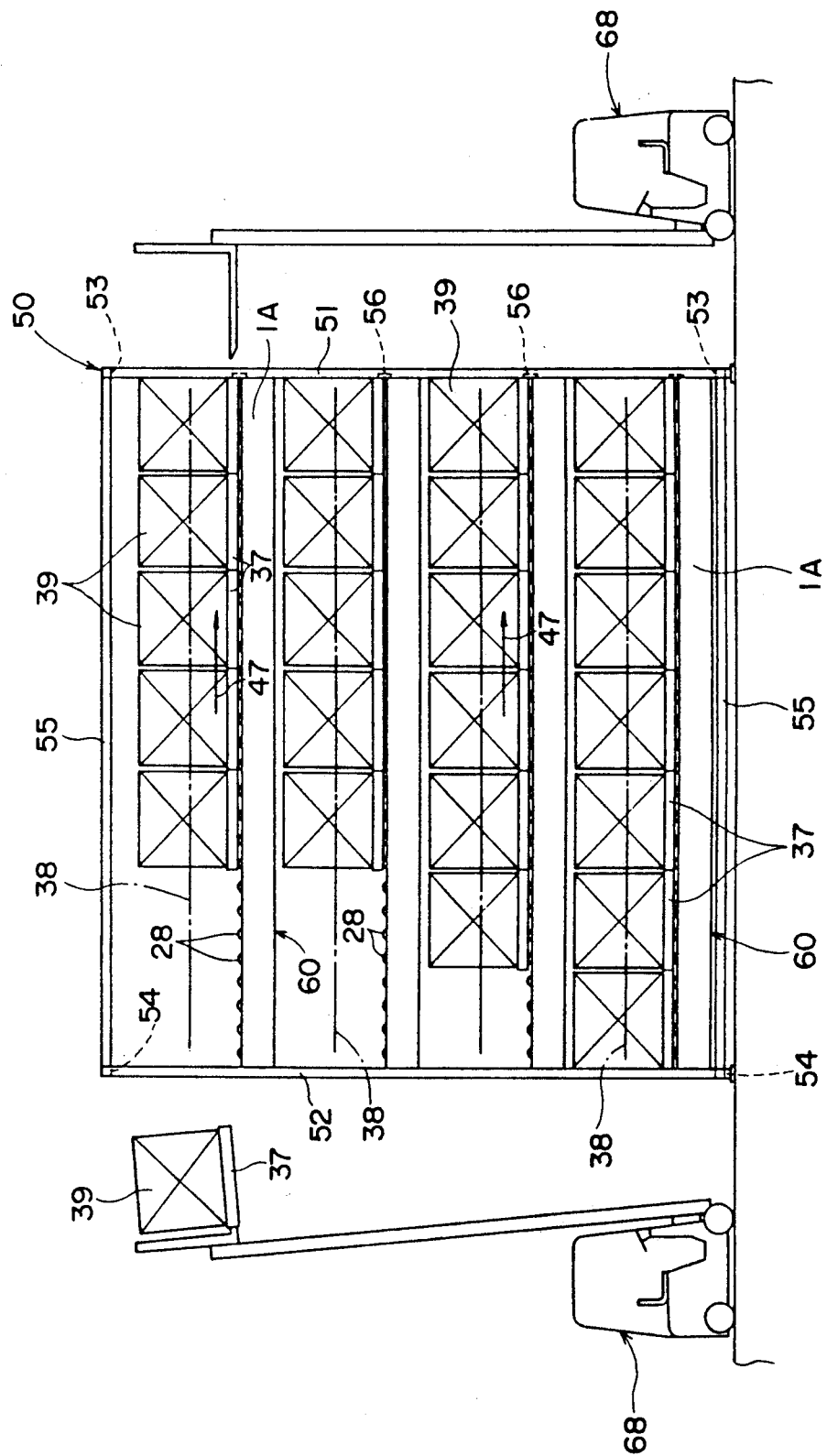
FIG. 1 is a side view of a shelf apparatus using rollers in a first embodiment.
Figure 2:
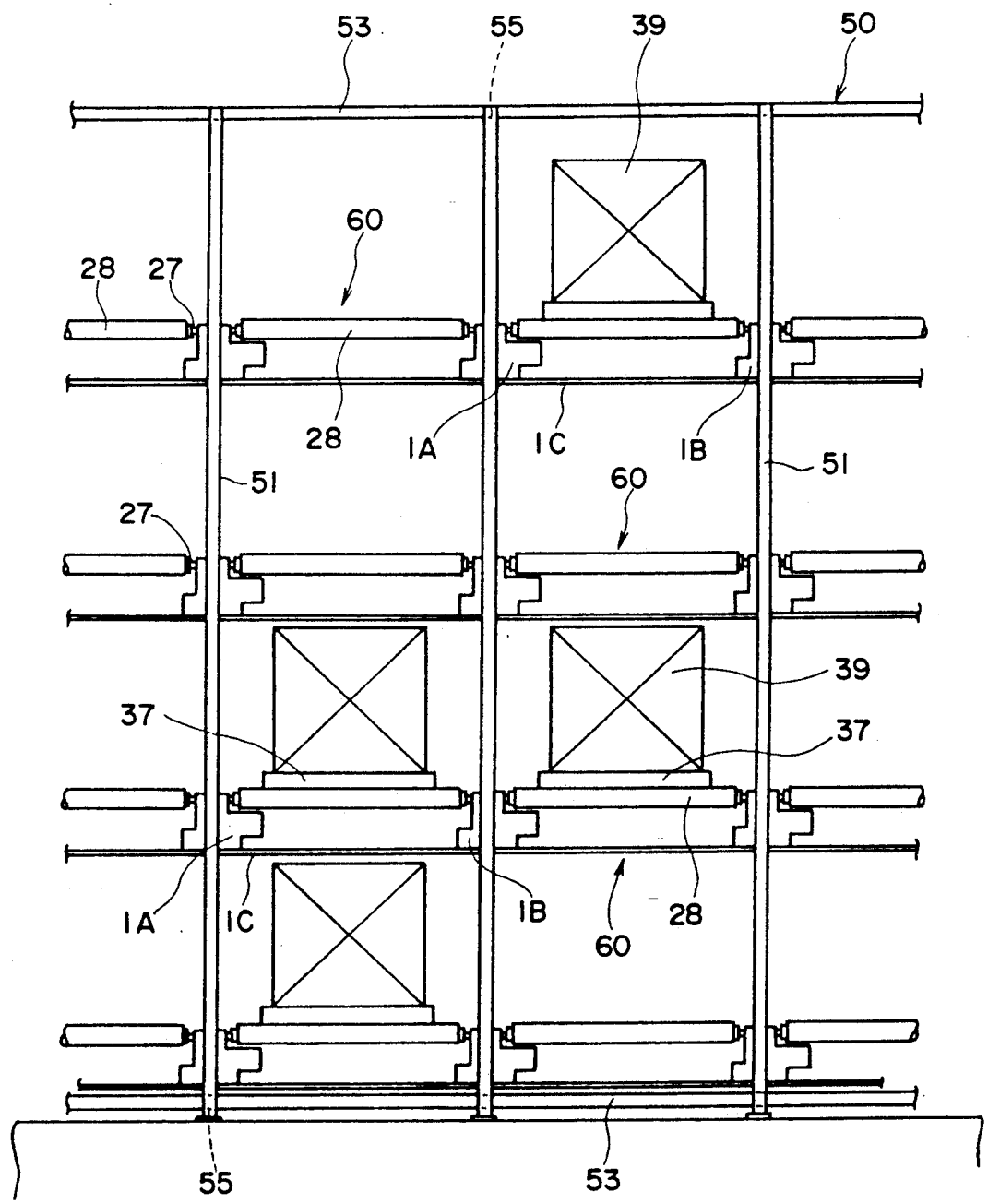
FIG. 2 is a front view of the shelf apparatus of FIG. 1.

FIG. 1 through 16 show a first embodiment of the invention. In FIGS. 1 and 2, the numeral 50 denotes a shelf frame comprising a plurality of transversely disposed front pillars 81, a plurality of transversely disposed rear pillars 52, front transverse member 53 connecting the front pillars 51, rear transverse members 54 connecting the rear pillars 62, and connecting members 55 connecting the front and rear pillars 51 and 52. Housed in a plurality of vertically and transversely spaced compartments defined between the pillars 51 and 52 of the shelf frame 50 are roller conveyors 60 each having a number of free rotation rollers, the direction of transport being horizontal.

Figure 3:
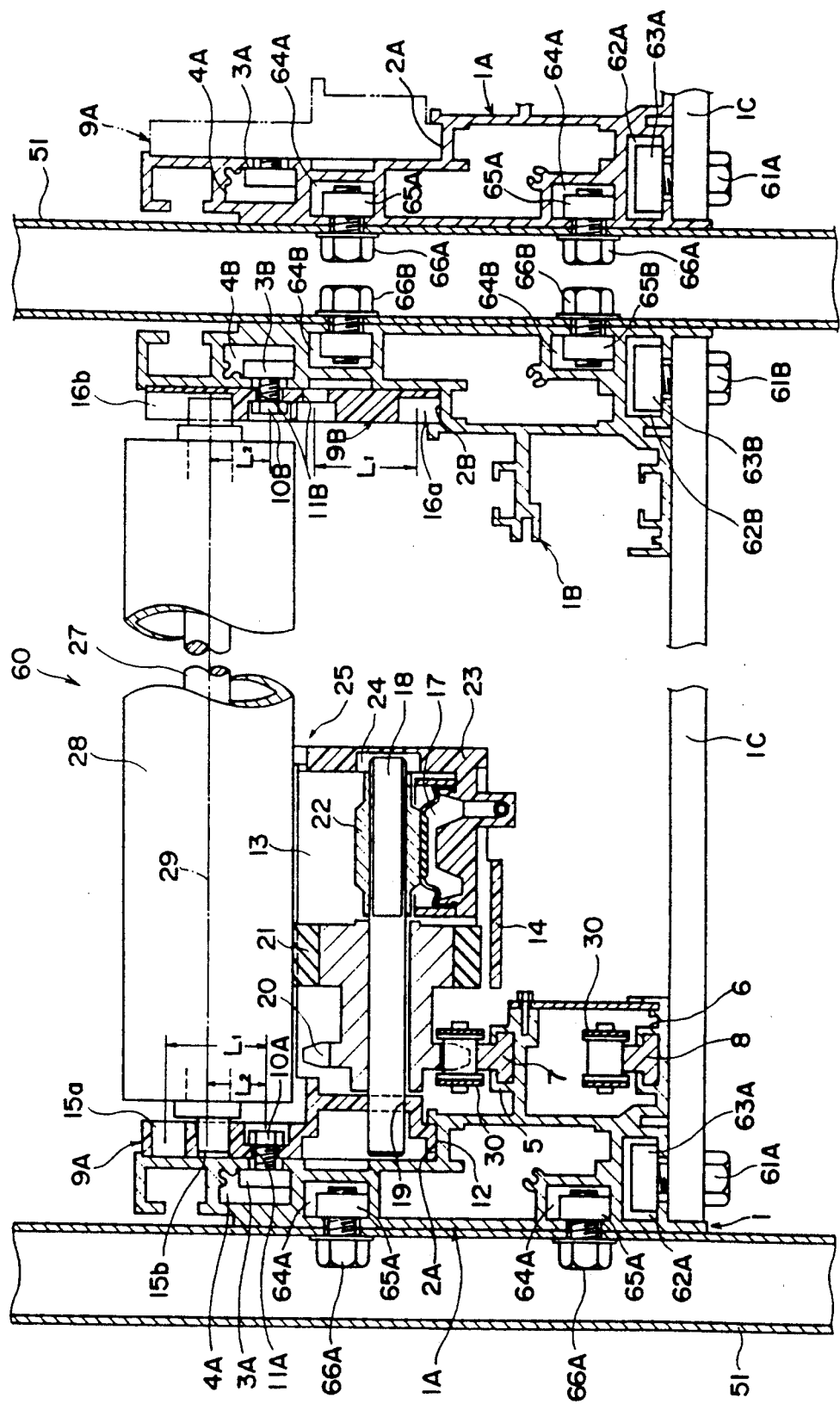
FIG. 3 is a front enlarged view, in section, of a roller conveyor in the shelf apparatus of FIG. 2.
Figure 4:
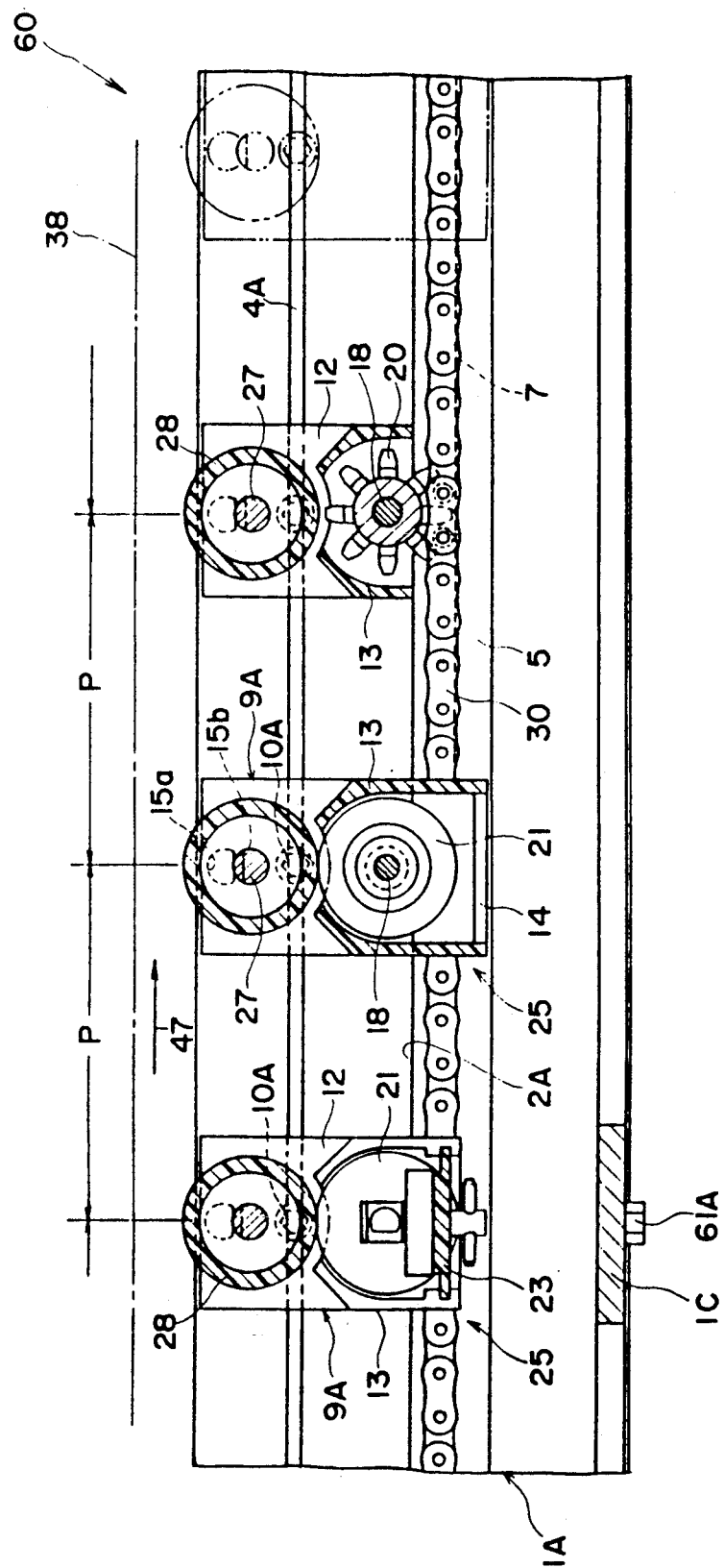
FIG. 4 is a side view, in section, of &he roller conveyor of FIG. 3.

As shown in FIGS. 3 and 4, the main frame 1 of each roller conveyor 60 is composed of a pair of lateral frames 1A and 1B and a base frame 1C connecting the lower regions of these lateral frames 1A and 1B. There are a plurality of such base frames 1C disposed in the direction of transport, and the lateral frames 1A and 1B are connected together by upwardly inserting bolts 61A and 61B into each base frame 1C from below for screwing them into plate nuts 63A and 63B fitted in dovetail grooves 62A and 62B formed in the lower surfaces of the lateral frames 1A and 1B. The lateral surfaces of the lateral frames 1A and 1B are formed with dovetail grooves 64A and 64B at two vertically spaced locations (a plurality of locations), with plate nuts 65A and 65B fitted in said dovetail grooves 64A and 64B. Bolts 66A and 66B are transversely inserted into the pillars 51 and 52 and screwed into the plate nuts 65A and 65B, whereby the main frame 1 is fixed to the shelf frame 50. The opposed lateral surfaces of the lateral frames 1A and 1B are formed with L-shaped guide portions 2A and 2B and the upper regions of said lateral frames 1A and 1B are also formed with dovetail grooves 4A and 4B which allow nuts 3A and 3B to slide In the direction of transport.

The lower portion of one lateral frame 1A has a pair of upper and lower guide rails 7 and 8 disposed therein in the direction of transport of the roller conveyor 60 through attachment portions 5 and 6. In the opposed inner sides of the lateral frame 1A and 1B, support frames 9A and 9B of resin are disposed with their lower ends fitted in the guide portions 2A and 2B, so that their positions can be changed by sliding them in the direction of the length of the frame. The support frames 9A and 9B are fixed in their changed positions by inserting bolts 10A and 10B into attachment holes 11A and 11B formed in their vertically intermediate regions thereof and screwing them into said nuts 3A and 3B.

One support frame 9A is in the form of a case comprising a base plate portion 12 formed with a lower end adapted to fit in the guide portion 2A and an attachment hole 11a, a pair of cover plate portions 13 extending from the lower half of said base plate portion 12 toward the other support frame 9B, and a connecting plate portion 14 extending between said cover plate portions 13. A pair of upper and lower through-holes 15a and 15b are formed above said attachment hole 11A in the base plate portion 12.

The other support frame 9B is a rectangular plate having a pair of attachment holes 11B. The upper and lower sides between which said attachment holes 11B are formed with engagement grooves 16a and 16b whose end surfaces associated with the upper and lower ends of the support frame 9B and end surfaces directed toward the support frame 9A are open. The distances L1 and L2 from &he respective bottoms of the engagement grooves 16a and 16b to the attachment holes 118 are equal to the distances L1 and L2 from the attachment hole 11A in the support frame to the through-holes 15a and 15b.

A free roller 28 of resin is rotatably mounted between the support frames 9A and 9B through a roller shaft 27. The roller shaft& 27, relatively rotatably inserted in the free roller 28, is inserted at one end thereof in either of the through-holes 15a and 15b and fitted at the other end thereof in either of the engagement grooves 16a and 16b from above, whereby the roller shaft 27 is installed in position and the free roller 28 is rotatable around the roller axis 29.

A support& shaft 18 extending along the roller shaft 29 is vertically swingably attached to the support frame 9A. More specifically, the lower end of &he base plate portion 12 is formed with a bearing portion 19, in which one end of the support shaft 18 is fit&ed, the other end being vertically swingable. An L-shaped plate portion 23 of resin is inserted between the free ends of the cover plate portions 23, and the other end of the support shaft 18 is fitted in a vertically extending recess 24 formed in the vertical plate of &he L-shaped plate portion 23, whereby &he range of vertical swing movement is defined.

Figure 8:
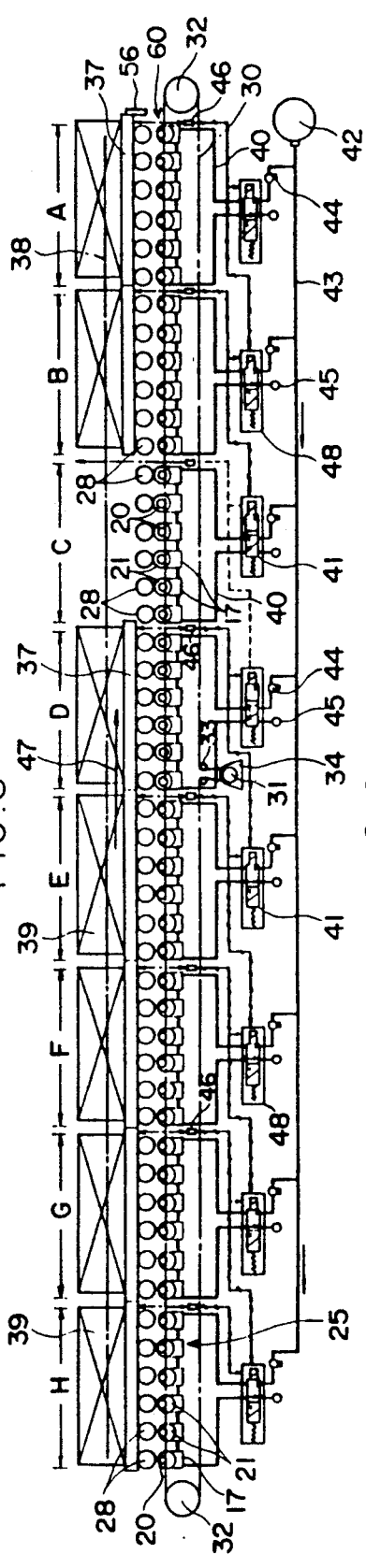
Figure 9:
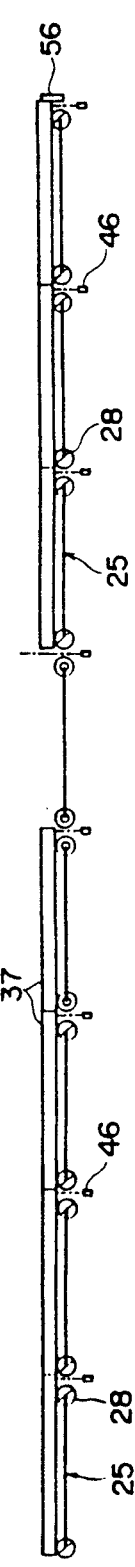

The support shaft& 18 has a sprocket 20 rotatably mounted thereon, and a transmission roller 21 is fitted on the boss portion of the sprocket 20 so that the two parts 20 and 21 are rotatable as one piece. This transmission roller 21 is made of urethane rubber and is adapted to be contacted at its outer periphery with and separated from the lower region of &he outer periphery of the free roller 28 by the vertical swing movement of the support shaft 18. An air cylinder device 17 for effecting this contact and separation movement is installed between a cylinder rubber support 22 attached to &he other end of the support& shaft 18 and the lateral plate of the L-shaped plate portion 23. These members 17-24 constitute a utilized driving device 25. The driving device 25 is associated with the free roller 28 through the support frames 9A and 9B to form a set; a number of such sets, as shown in FIG. 8, are mounted on the main frame 1 in the direction of transport of the conveyor 60.

The chain 30, which is a driving body common to the sprockets 32, is installed between a driving sprocket 31 and driven sprockets 82 through guide sprockets 33, said driving sprocket& 31 being operatively connected to a motor 34.

Free rollers 28 each paired with a driving device 25 are disposed on the main frame i with a predetermined pitch P, thereby constituting a transport path 38. The numeral 39 denotes an object to be transported, which is transported through a pallet 37. The terminal end of the transport path 38 is provided with a stopper 56 which is fixed on the side associated With the shelf frame 50.

In the example shown in FIG. B, six free rollers 28 each paired with a driving device 25 form a group, and eight such groups A, B, C, D, E, F, G and H are disposed in a predetermined manner, with a driving device 25 being connected to or disconnected from the free roller 28 in each each group. That is, for each group, there is provided an air charge and discharge hose 40 connected in series with the air cylinder 17. These air charge and discharge hoses 40 are selectively connectable to a common air supply hose 43 through their respective solenoid valves 41. The numeral 44 denotes regulators and 45 denotes silencers. The downstream end of each of the groups A, B, C . . . H in the direction of transport 47 is provided with a photosensor 46 which is an example of a load detector.

In two adjacent groups in the direction of transport 47, when the photosensor 46 of the upstream group detects a load but the photosensor 46 of the downstream group does not detect a load, the driving devices 25 of the two groups simultaneously effect pressure contact with the free rollers, 28, that is, the air supply hose 43 is connected to the air charge and discharge hoses 40. If the photosensors 46 of the two groups simultaneously detect or do not simultaneously detect loads, the driving devices 25 of the two groups simultaneously effect separation, that is, the air supply hose 43 is disconnected from the air charge and discharge hoses 40. For this purpose, the solenoid valves 4 are installed in the respective control units 48. The most downstream group A alone is arranged so that when its photosensor 46 detects a load, the driving device 25 effects separation.

The transport operation based on the above arrangement will now be discharge.

FIGS. 3 and 4 show a state in which the solenoid valve 41 is switched for connecting the air supply hose 43 to the air charge and discharge hose 40 to extend the air cylinder device 17 so as to cause the support shaft 18 to swing upward to press the transmission roller 21 upwardly against the free roller 28. At this time, the chain 30 is constantly driven by the motor 34, so that the sprocket 20 engaging the chain 30 is rotating around the support shaft 18. Further, the transmission roller 21 abuts against the lower portion of the outer periphery of the corresponding free roller 28 thus the free rollers 28 are forcibly rotated and hence pallets 27 can be transported on the transport path 38.

The roller conveyor 60 effects the transport of pallets (loads) 27 basically in the above described manner, but in practice transport control is effected on the basis of detection and non-detection by photosensors 46. With the transport path 38 is empty, when a pallet 37 is unloaded onto the group H at the upstream end of the transport path 38, the photosensor 46 of the group H makes a detecting operation. At this time, since the photosensor 46 of the group G is the non-detecting state, the free rotation rollers 28 of the two groups H and G are forcibly rotated by the operation of the control units 48 and solenoid valves 41, whereby the pallet 37 is transported from group H to group G. When the pallet 37 enters the group G, the photosensor 46 of this group G senses it, so that the groups G and F effect connection so as to transport the pallet 37 to the group F. The pallet 37 which is transported successively downstream in this manner finally abuts against the stopper 56 and stops there to be stored in the group A. The photosensor 46 detects this pallet 37, so &hat the transmission roller 21 in the group A is separated from the free roller 22. The second pallet 37 is likewise transported until it abuts against the pallet 37 in the group A and stored in the group B. At this time, the photosensor 46 of the group B detects the pallet 37 but since the photosensor 46 of the group A is also detecting the first pallet 37, the transmission roller 21 of this group B is also separated from the free roller 28.

Figure 5:
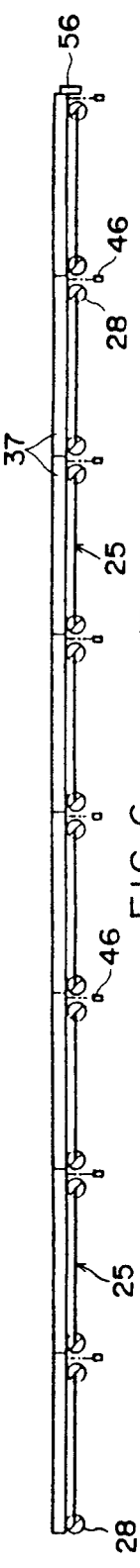
FIG. 5 through is are schematic side views showing an example of the operating state of the roller conveyor in the first embodiment.

In such operation, as shown in FIG. 5, suppose that pallets 37 have been stored in all group A through H and that all transmission rollers 21 have been separated from the free rollers 28.

Figure 6:
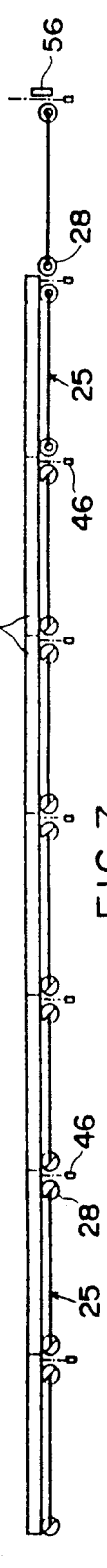
Figure 7:
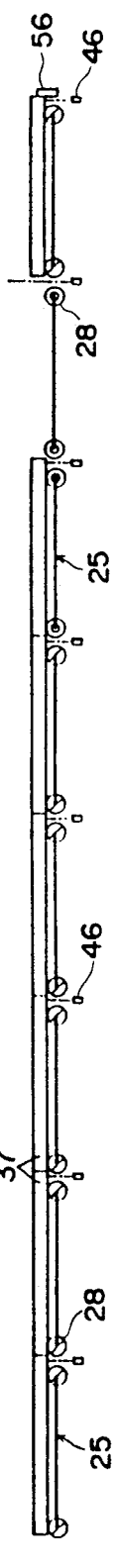

In this state, if the forklift cart 68 takes out the pallet& 37 of the group A, as shown in FIG. 6, the photosensor 46 of the group A becomes non-sensing; therefore, the driving devices 25 of the groups A and B effect connection, whereby the pallet 37 of the group B is transported to the group A, as shown in FIG. 7. Thereupon, the photosensor 46 of the group B assumes the non-detecting state, so that the driving devices 25 of the groups B and C effect connection, thereby transporting the pallet 27 of the group C to the group B, as shown in FIG. 8. With such action repeated, successive feeding of pallets 37 is effected, as shown in FIGS. 9 through 13.

For example, suppose that the photosensor 46 of the group F is the non-detecting state, as shown in FIG. 11. In this state, if the pallet 37 of the group A is removed, as shown in FIG. 14, then successive feeding is effected at two places in the direction of the transport 47, as shown in FIGS. 15 and 16. Likewise, successive feeding at three or more places is possible.

Figure 18:
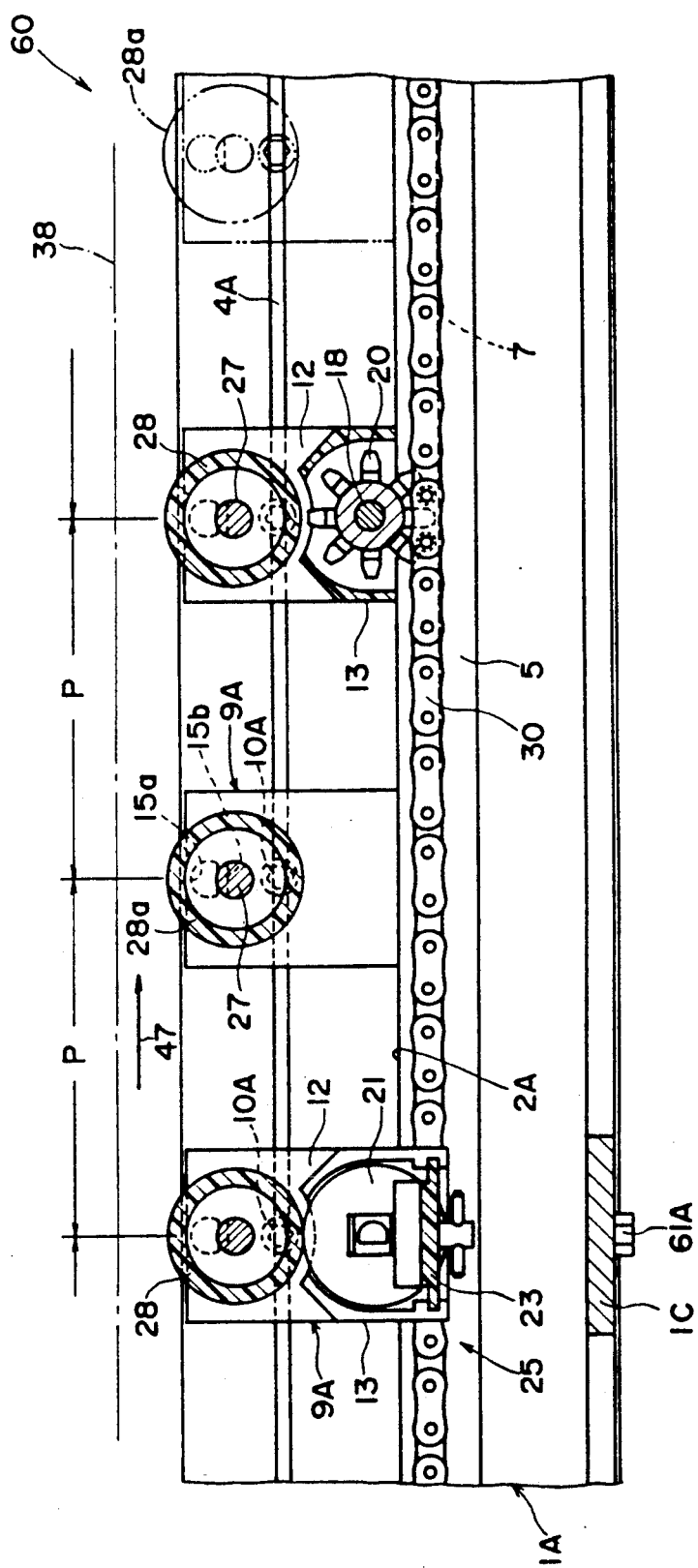
FIG. 18 is a side view, in section, of the roller conveyor of FIG. 17.
Figure 19:
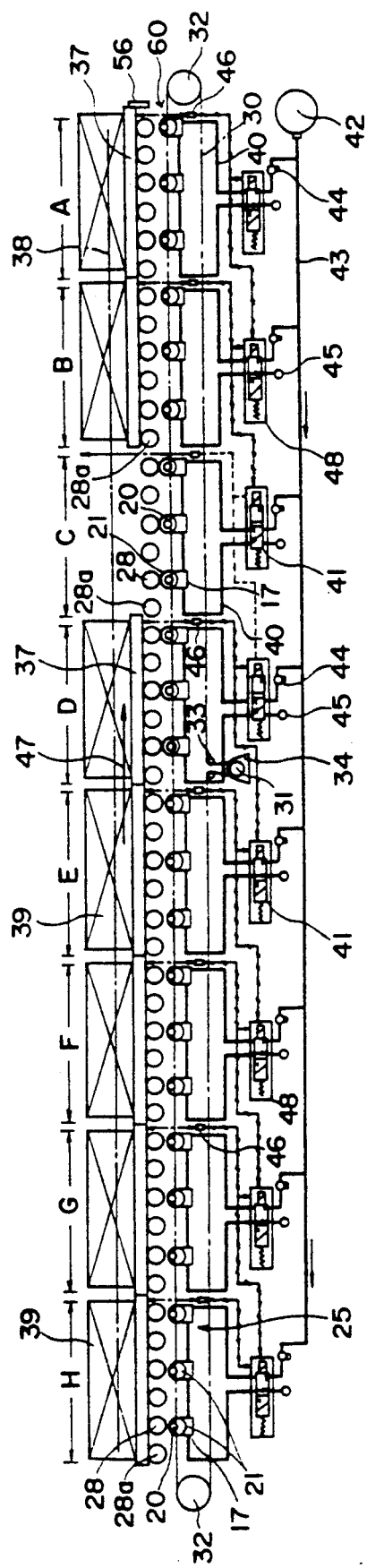
FIG. 19 is a schematic side view showing the whole of the roller conveyor of FIG. 17.

A second embodiment of the invention is shown in FIGS. 17 through 19. In this case, the driving devices 25 are respectively paired with every other free roller 28 in the direction of transport 47. In the places where there is no driving device, as shown in FIG. 17, the support frame 2A is simply in the form of a rectangular plate as in the case of the support 9B, having through holes 15a and 15b formed therein for receiving one end of the roller shaft 27 of the free roller 28a.

According to such arrangement, the free roller 28 paired with the driving devices 25 are forcibly rotated by the latter, whereby pallets 37 are transported on the transport path 88. At this time, the non-driven free roller 28a make an accompanying rotation. Since only some of the free rollers 28, 28a are driven, the cost for the driving devices 25 is reduced as compared with that required for driving all of them.

The above shows an example in which driven free rollers 28 alternate with the non-driven free rollers 28a; ; however, free rollers 28 may be installed at every four places. Further, in each of the groups A through H, if a driven free rotation roller 28 is installed at the downstream end in the direction of transport 47, then even if pallets 37 are made of resin, they can be positively delivered from each group; particularly when the present invention is incorporated in an automatic warehouse, automatic operation of a device for putting loads in and out can be reliably performed.

Figure 20:
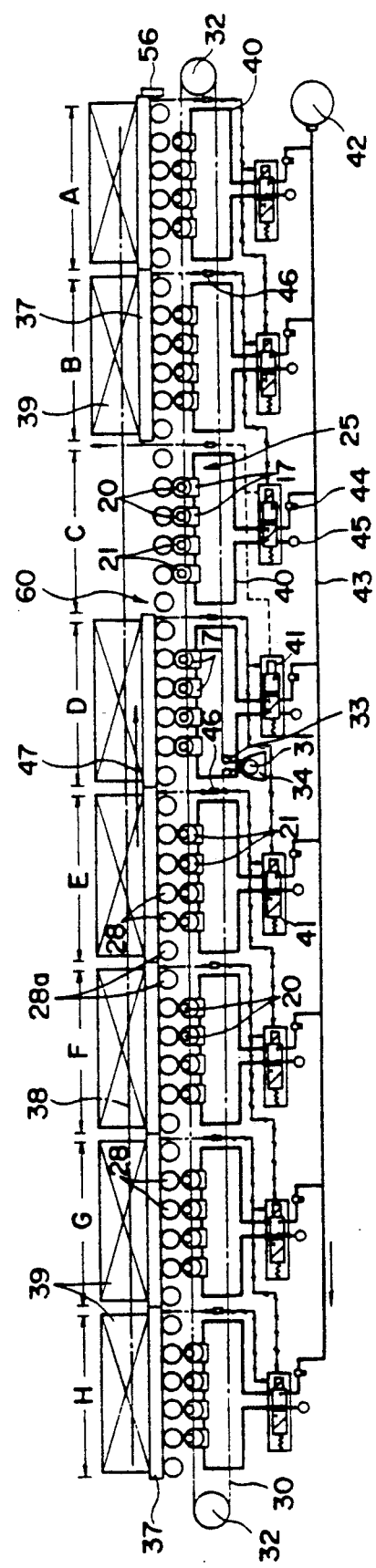
FIG. 20 is a schematic side view of the whole of a roller conveyor in a third embodiment.

FIG. 20 shown a third embodiment of the invention. In this example, in each of the groups A through H, the upstream and downstream free rollers in the direction of transport 47 are non-driven free rollers 28a, , while the remaining four free rollers are free rollers 28 which are respectively paired with driving devices 25.

According to such arrangement, in the load storage state, When each of the groups B through H on the upstream side in the direction of transport 47 is driven for successively feeding pallets 37, of the free rollers 28 and 28a, , only the intermediate free rollers 28 in this group are driven. As a result, the transport force to be transmitted to pallets 37 is reduced, so that successive feeding of pallets 37 is slowly effected; therefore, separation between pallets 37 on the further upstream side in the contacted storage state and pallets 37 to be successively fed is reliably effected. Further, as in the case of the second embodiment described above, the number of driving devices 25 and the capacity of the motor 34 can be reduced as compared with the case of driving all free rollers.

FIGS. 21 through 24 show a fourth embodiment of the invention. In this example, driving devices 25 are paired with all free rollers 28, and each group is provided with an air charge and discharge hose 40 having series connected air cylinder devices 17, the respective downstream ends of these air charge and discharge hoses being selectively connectible via respective valves devices to and disconnectible from a common air supply hose 43 extending from an air supply device 42. As to the valves devices, the groups B through H, excepting the most downstream group A, have mechanical valves 82. Upwardly directed actuator rode 81 project above the transport plane upstream of the respective most downstream free rotation rollers 28 in the groups B through H. The most downstream group A has a solenoid valve 84 associated with a photocell 83 for detecting loads, the detection light being directed upward.

When any actuator rod 81 projects upward because of absence of a load, the associated mechanical valve 82 connects the air charge and discharge hose 40 to the air supply hose 43, whereas if a pallet 37 is present and the actuator rod 81 is thereby depressed, the mechanical valve 82 disconnects the air charge and discharge hose 40 from the air supply hose 43. The solenoid valve 84 connects the hoses 40 and 43. When the photosensor 83 is the non-detecting state with no pallet 37 present and disconnects the hoses 40 and 43 when the photosensor 88 is in the detecting state with a pallet 37 present.

In the groups C through H other than the two downstream groups A and D, the downstream ends of the air charge and discharge hoses 40 are connected via respective connecting hoses 85 to the upstream ends of the charge and discharge hoses 40 in the groups 8 through G located respectively one group downstream. In the two downstream groups A and B, the downstream ends of the air charge and discharge hoses 40 are connected together by a connecting hose 86. The hoses 40, 43, 83 and 86 constitute an operating circuit 87 having driving devices 25 and valve devices placed therein. The operating circuit 87 operates such that when there is no load in the downstream one of two adjacent groups in the direction of transport 47, it connects the two driving devices 25 to the free rollers 28 and such that when there is a load in the most downstream group A, it disconnects the driving device 25 from the free roller 28.

Figure 22:
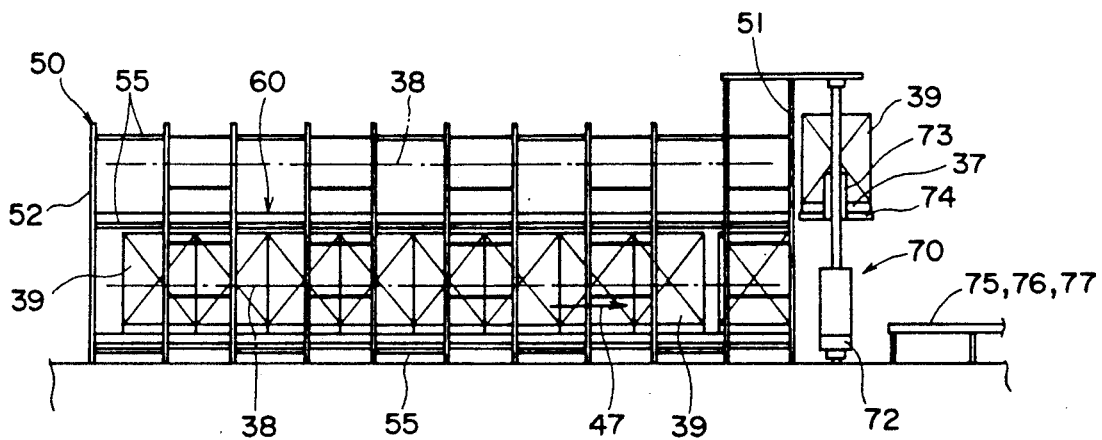
FIG. 22 is a front view of a shelf apparatus using rollers of the fourth embodiment of the invention using the roller conveyor of FIG. 21.
Figure 23:
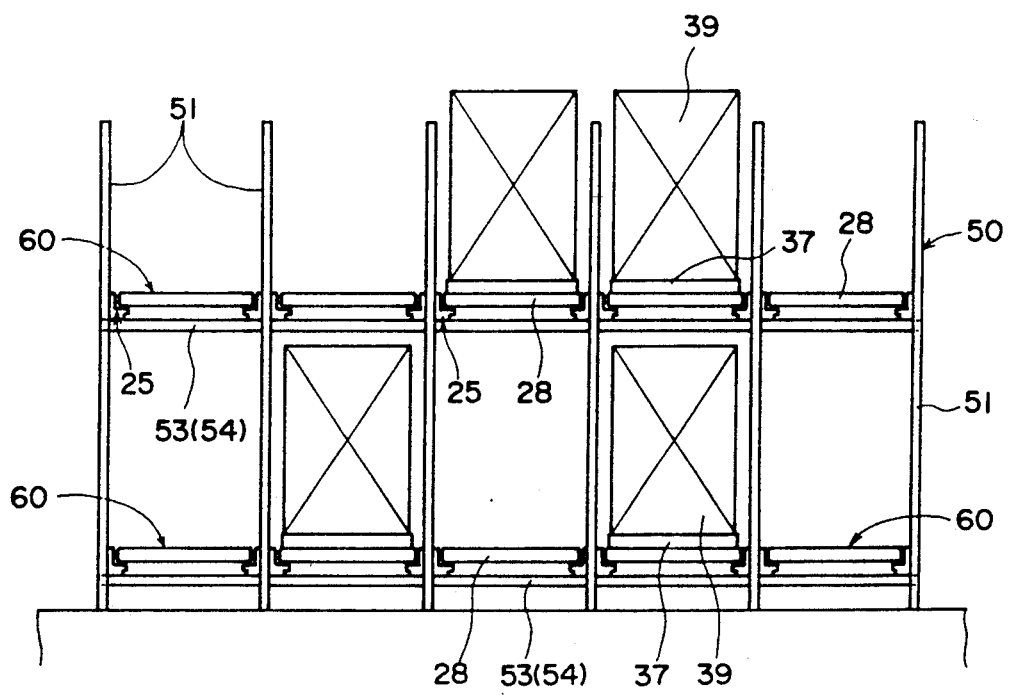
FIG. 23 is a front view of the shelf apparatus of FIG. 22.
Figure 24:
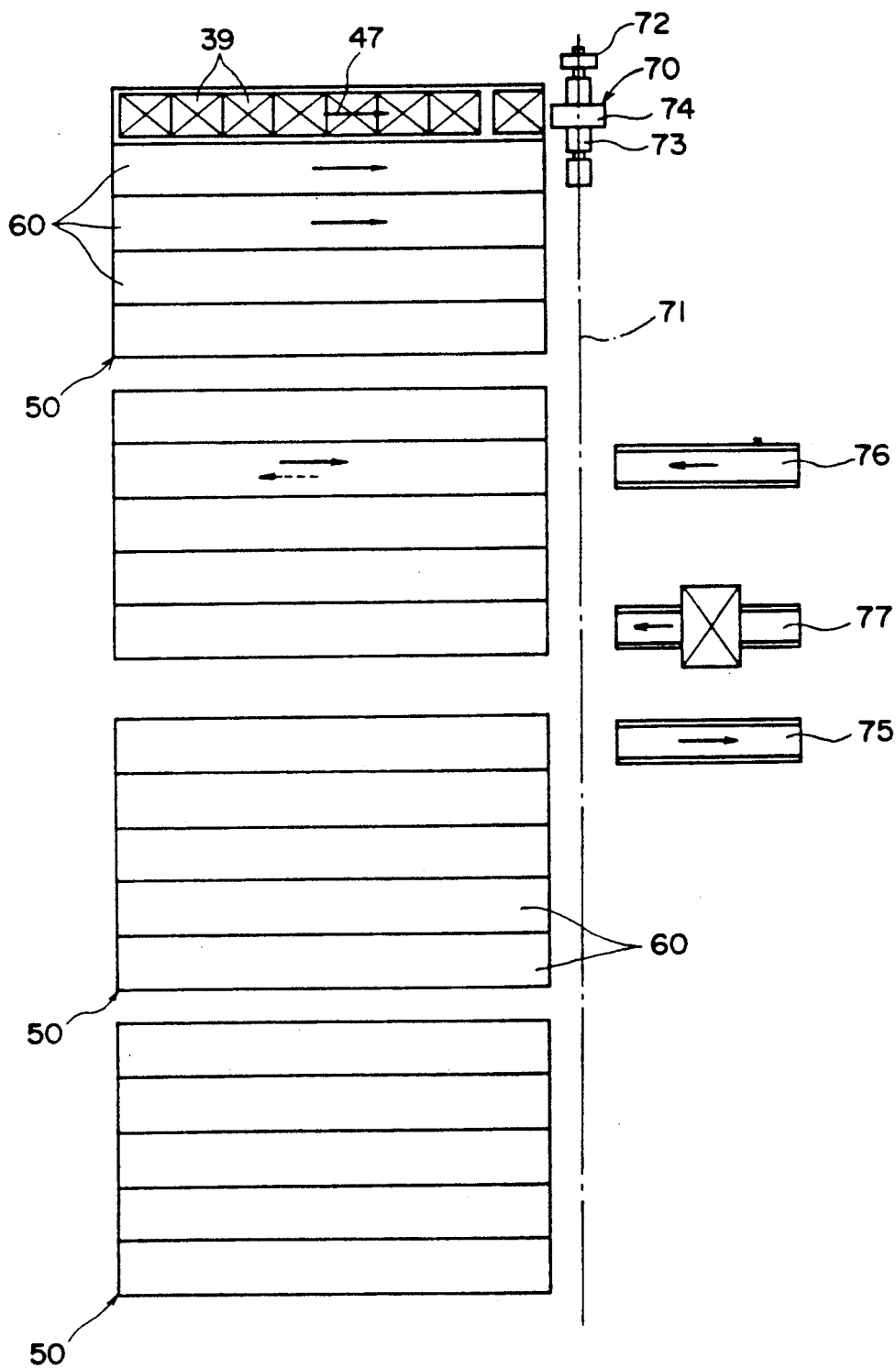
FIG. 24 is a plan view of the shelf apparatus of FIG. 22.

As shown in FIGS. 22 through 24, a load handling device 70 is installed outside the shelf frame 50 in opposed relation to the most downstream group A. The load handling device 70 comprises a traveling machine body 72 capable of moving back and forth in a predetermined path 71 along a row of shelf apparatuses, an elevating frame 73 mounted on said traveling machine body 72, and a fork 74 adapted to be advanced and retracted transversely of the elevating frame 73. On the side of the predetermined path 71 opposite the row of shelf apparatuses, there are a shipping conveyor 75, a return conveyor 76, and an empty pallet conveyor 77.

The transport operation according to the above arrangement will now be described.

If the transport path 38 is empty, the respective actuator rods 81 of the mechanical valves 82 are projecting and are in the non-detecting state and the photosensor 83 of the solenoid valve 84 is also in the non-detecting state, with the result that the air from the air supply hose 43 is fed to all charge and discharge hoses 40 via the mechanical valves 82 and solenoid valve 84, thereby extending the air cylinder devices to forcibly rotate all free rollers 28 of all groups A through H. In this state, if a pallet 37 is unloaded onto the upstream group H as by a forklift cart, the mechanical valve 82 of the group H has its actuator rod 81 depressed and thereby effects disconnection. However, since the mechanical valve 82 of the group G located one group downstream is in the non-detecting state, as described above, part of the air fed to this group G is fed to the charge and discharge hose 40 via the connecting hose 85, thereby causing the air cylinder device 17 of the group H to effect connection. Thus, the free rollers 28 of the groups H and G are forcible rotated to transport the pallet 37 from the group H to the Group H. When the pallet 37 enters the group G, the mechanical valve 82 of this group G makes a detecting action, but since the group F is in the non-detecting state, as described above, the free rollers 28 of the group G are forcibly rotated to transport the pallet 37 form the group G to group F. In this manner, the pallet 37 transported successively downstream until it is stored in the group A.

The photosensor 83 of the group A detects this pallet 37 and causes the solenoid valve 84 to effect separation, whereupon the supply of air to the charge and discharge hose 40 of the group A is stopped and simultaneously therewith the charge and discharge hose 40 is opened, so that the driving device 25 of the group A effects separation to stop the forcible rotation of all free rollers 28 of this group A.

The second pallet 37 is likewise transported; is about against the pallet 37 in the group A and stored in the group B. At this time, detection is effected in the group B, but since group A is also in the detecting state, separation is effected in this group B.

Figure 21:
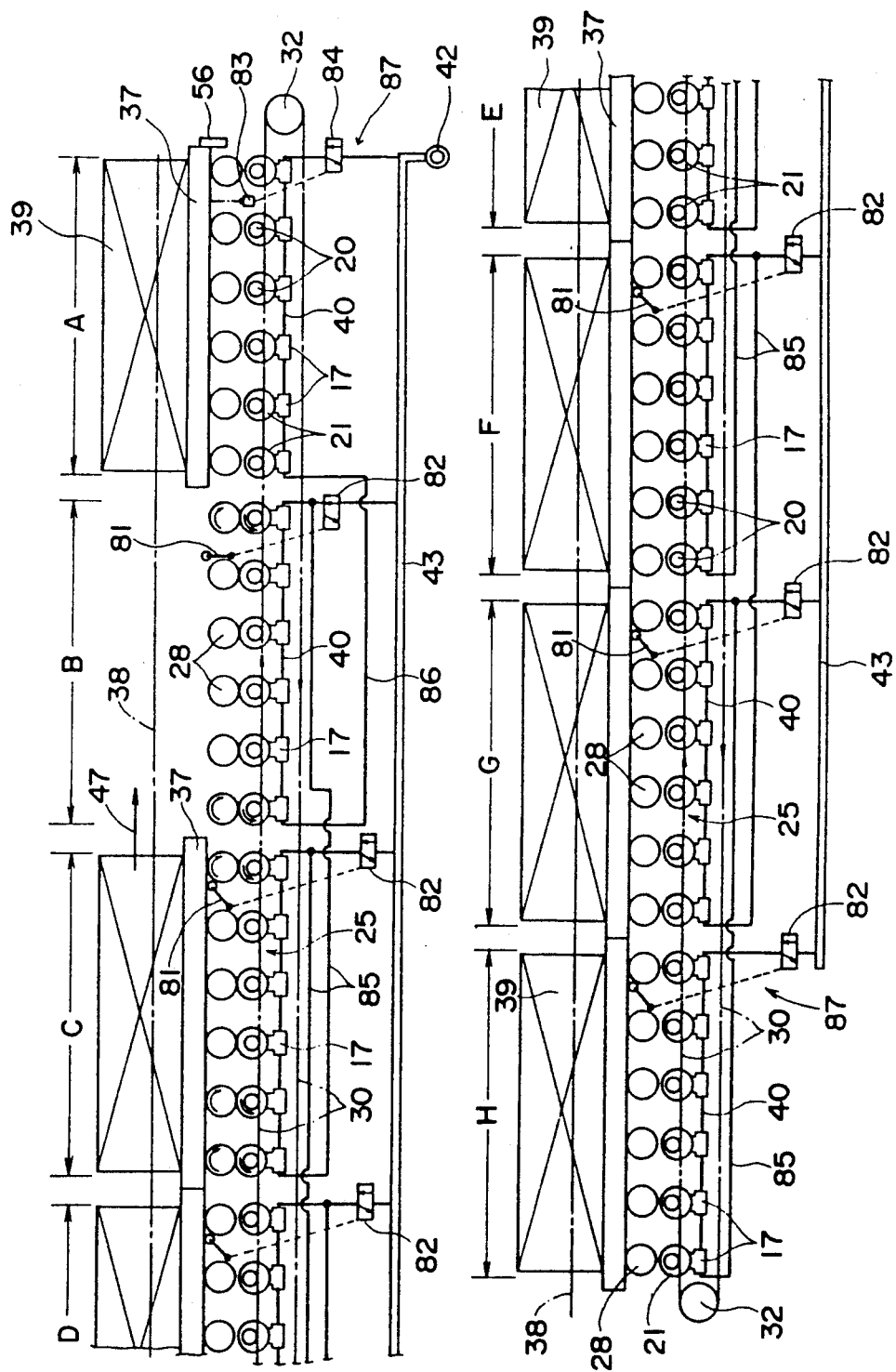
FIG. 21 is a schematic side view of the whole of a roller conveyor in a fourth embodiment.

In such state, when the pallet 37 in the group A is taken out by the load handling device 70, the photosensor 83 of the group A assumes the non-detecting state, so that the groups A and B effect connection, whereby the pallet 37 in the group B is transported to the group A. Thereupon, the actuator rod 81 of the group B assumes the non-detecting state, as shown in FIG. 21, so that connection is effected in the groups P and C, transporting the pallet 37 in the group C to the group B. With such action repeated, successive feeding of the pallet 37 is effected as in the case of FIGS. 9 through 13.

The taking out of the pallet 37 from the group A by the load handling device 70 is effected by a combination of the traveling of the traveling machine body 72, the rising and lowering movement of the elevating frame 73 and the lateral advance and retraction of the form 74. The pallet 37 taken out is transferred to the shipping conveyor 75 in a similar operation. A pallet 27 shipped by mistake is transferred to the return conveyor 76, while empty pallets 37 are stacked and transferred to the empty pallet conveyor 77. These pallets 27 are transferred to a particular transport path 32 by the reverse operation of the load handling device 70, and in this particular location, the direction of transport 47 Is reverse to the other locations.

Forking mistakes sometimes occur during the taking out of pallets 37 by the fork 74 of the load handling device 70 or forklift cart 68. In this case, when the pallet 37 is within the range of detection by the photosensor 83 as when this pallet 37 is slightly raised or moved for removal, the solenoid valve 84 maintain disconnected state of the hoses 40 and 43. Therefore, in this case, since the group 8 is also in the disconnected state, as described in the preceding embodiment, the pallet 37 in this group B is not transported; thus, when the operator is aware of the forking mistake, he can return the pallet 37 to the group A.

In addition, the output signal from the photosensor 83 can be utilized in group control as a load detecting signal indicating the presence of a load in the group A. Also, when pallets 37 are taken out by a forklift cart instead of by the load handling device 70, it is possible to light a load presence indicator lamp on the basis of the load detecting signal.

Figure 25:
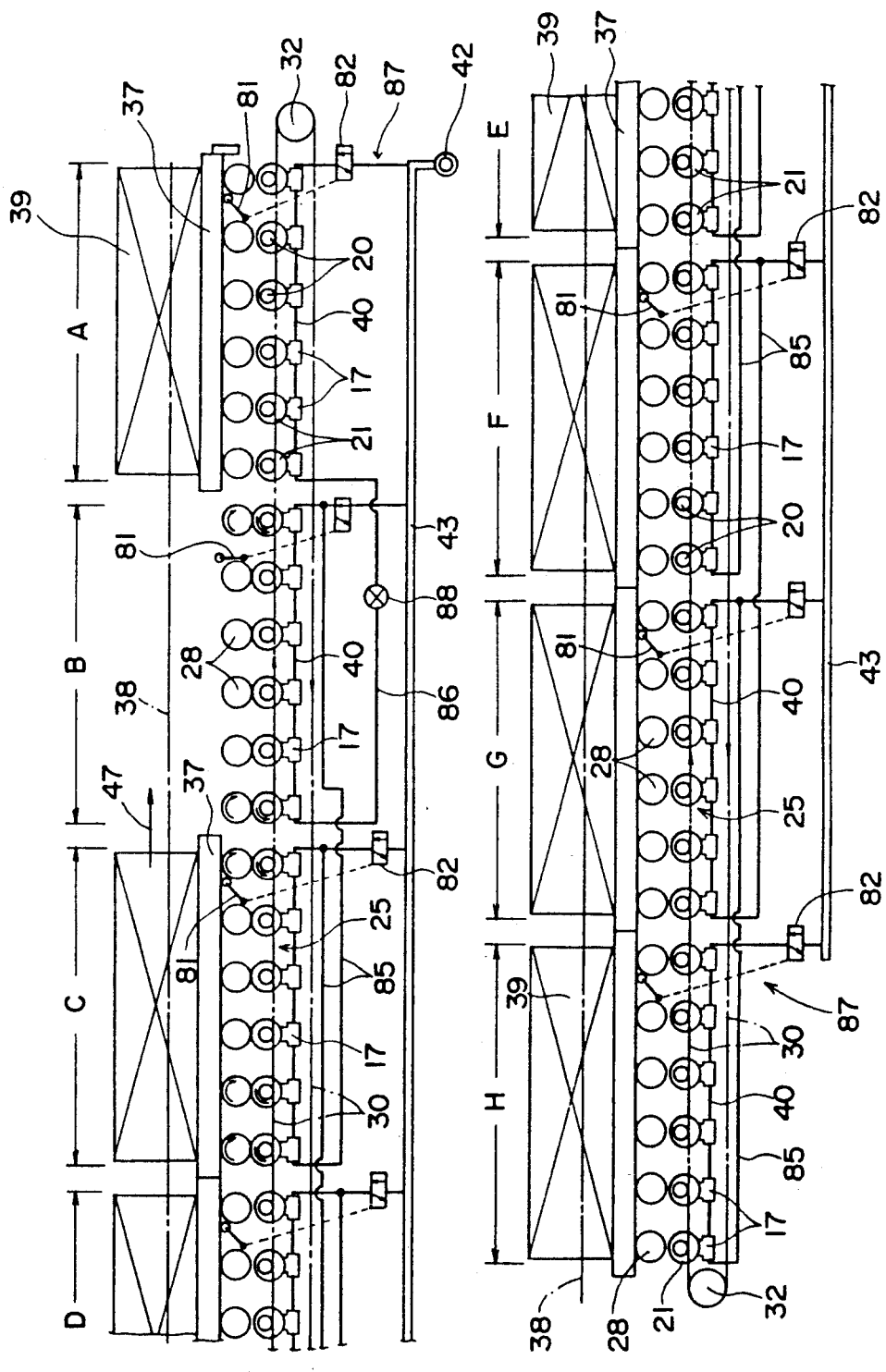
FIG. 25 is a schematic side view showing the whole of a roller conveyor in a fifth embodiment.

FIG. 25 shows a fifth embodiment of the invention. This embodiment, as in the preceding fourth embodiment, has mechanical valves 82 serving as load presence detecting devices each having an actuator rod 81. Further, in this embodiment, not only the groups B through H but also the group A has a mechanical valve 82 having an actuator rod 81.

In the groups C through H other than the two downstream groups A and B, the downstream ends of the air charge and discharge hoses 40 are connected via connecting hoses 85 to the downstream ends of the air charge and discharge hoses 40 in the groups B through G located respectively one group downstream. In the two downstream groups A and B, the upstream ends of the air charge and discharge hoses 40 are connected by a connecting hose 86 which has a time delay valve 88 placed therein.

As compared with the fourth embodiment using a load handling device 70, the embodiment shown in FIG. 25 is suitable for use in the case of using a forklift cart 68 such as in FIGS. 1 and 2. In this case, forking mistakes sometimes occur during taking out the pallet 37 of the group A by the forklift cart 68. If no measures are taken under these circumstances, the mechanical valve 82 of the group A assumes the non-detecting state, so that the pallet 37 in the group B is fed to the group A; thus, the forked pallet cannot be returned to the group A. According to this embodiment, however, since the connecting hose 86 is closed for a certain time by the time delay valve 46, separation can be established in the group B and maintained for this preset time. Therefore, when the operator is aware of the forking mistake, he can return the pallet 37 to the group A.

In the fourth and fifth embodiments, as in the first embodiment, all free rollers 28 are of the driven type; however, non-driven free rollers may be added, as in the second and third embodiments.

Figure 26:
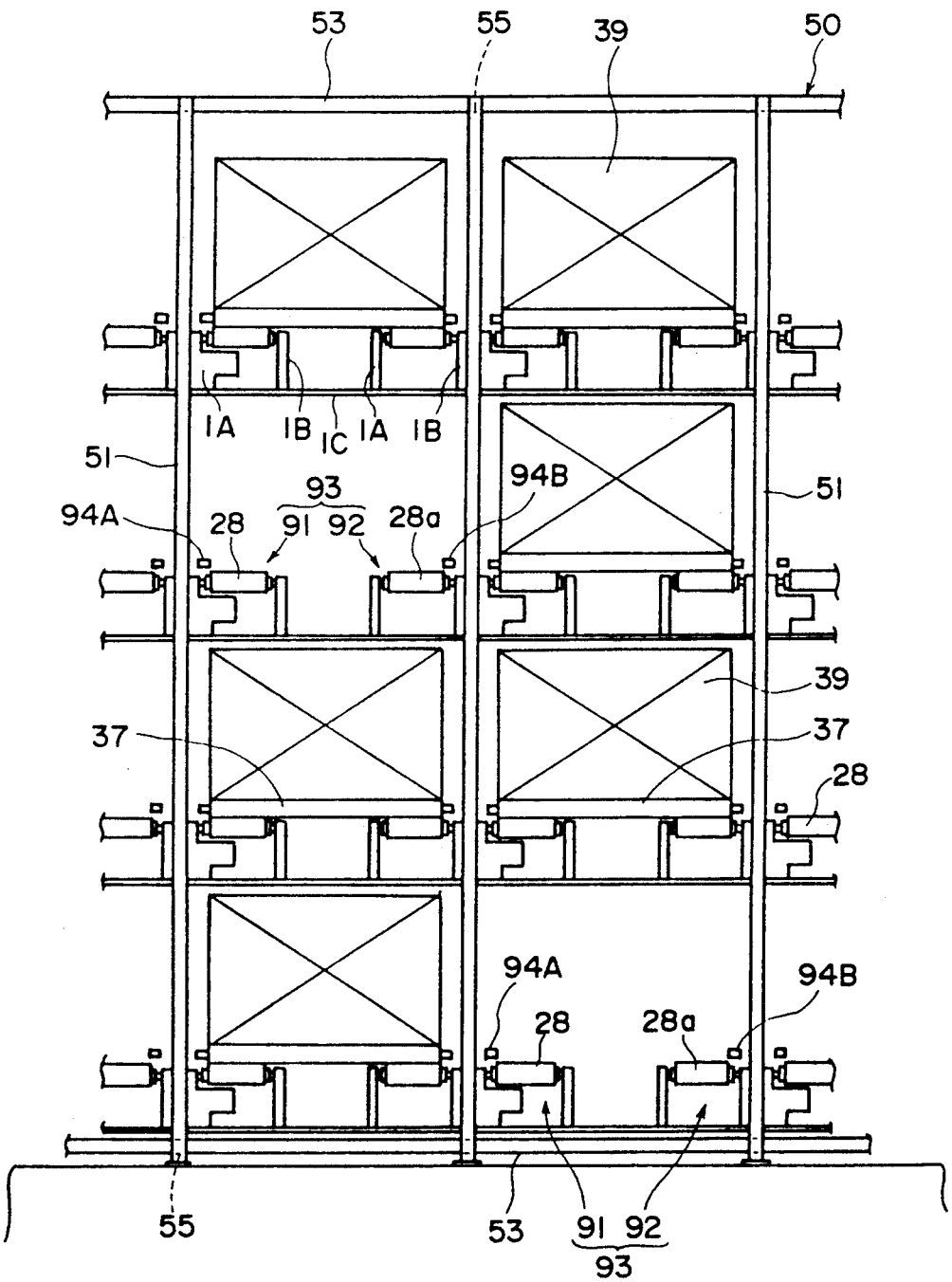
FIG. 26 is a front view of a shelf apparatus using rollers of a sixth embodiment of the invention.
Figure 27:
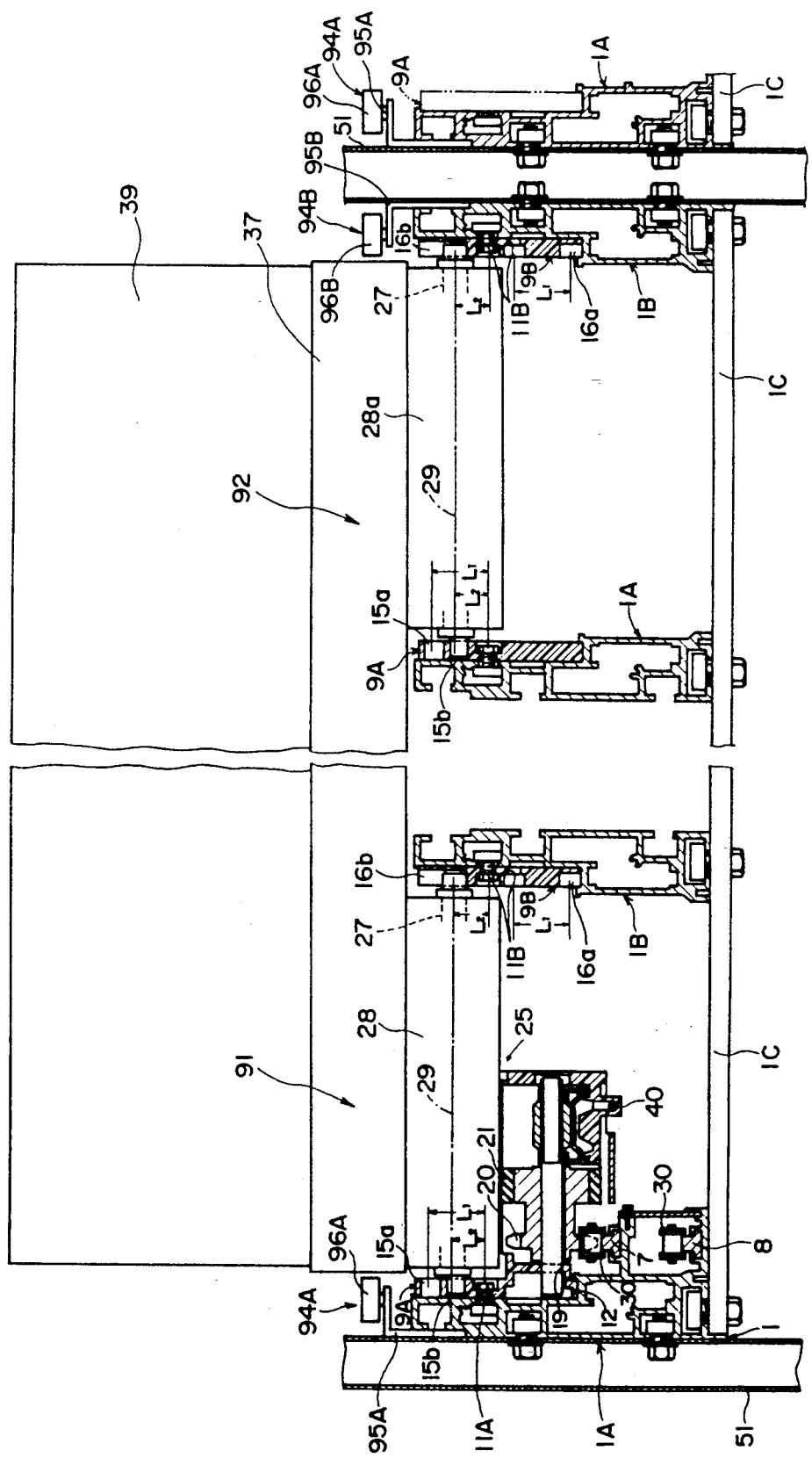
FIG. 27 is an enlarged front view, in section, showing the roller conveyor in the shelf apparatus of FIG. 26.

FIGS. 26 and 27 show a sixth embodiment of the invention. In this embodiment, each of the compartment defined between the pillars 51 and 52 of the shelf frame 80 has a transport device 93 consisting of two rows of roller conveyors 91 and 92 each having a number of free rollers. One roller conveyor 91 has free rollers 28 paired with driving devices 25, being of the same construction as the roller conveyor 60 of FIG. 3. Some of the free rollers of the roller conveyor 91 may be replaced by free rollers of the construction of FIG. 17. Which are not paired with driving devices. The other roller conveyor 92 has non driven free rollers alone as in the case of the roller conveyor 60 of FIG. 17.

The lateral frames 1A and 1B on the side associated with the pillars 51 and 52 in the two roller conveyors 91 and 92 are provided with guide devices 94A and 94B positioned laterally of the transport path 38. These guide devices 94A and 94B comprise removable frames 95A and 95B on the lateral frames 1A and 1B, and guide rollers 96A and 96B disposed on the upper surfaces of said frames 95A and 95B. In addition, the guide devices 94A and 94B may be in the form of guide plates.

According to such arrangement, a pallet 37 is transported as it is supported on the two roller conveyors 91 and 92 while receiving a transport force from one roller conveyor 91 and while being guided by the guide rollers 96A and 95B. By installing roller conveyors 91 and 92 on opposite sides and designing only one of the two as the driven type, the driving system can be simplified and less expensive. Despite this one-sided driven type, pallets 37 can be prevented by the guide rollers 96A and 96B from zigzagging while they are transported.

Figure 28:
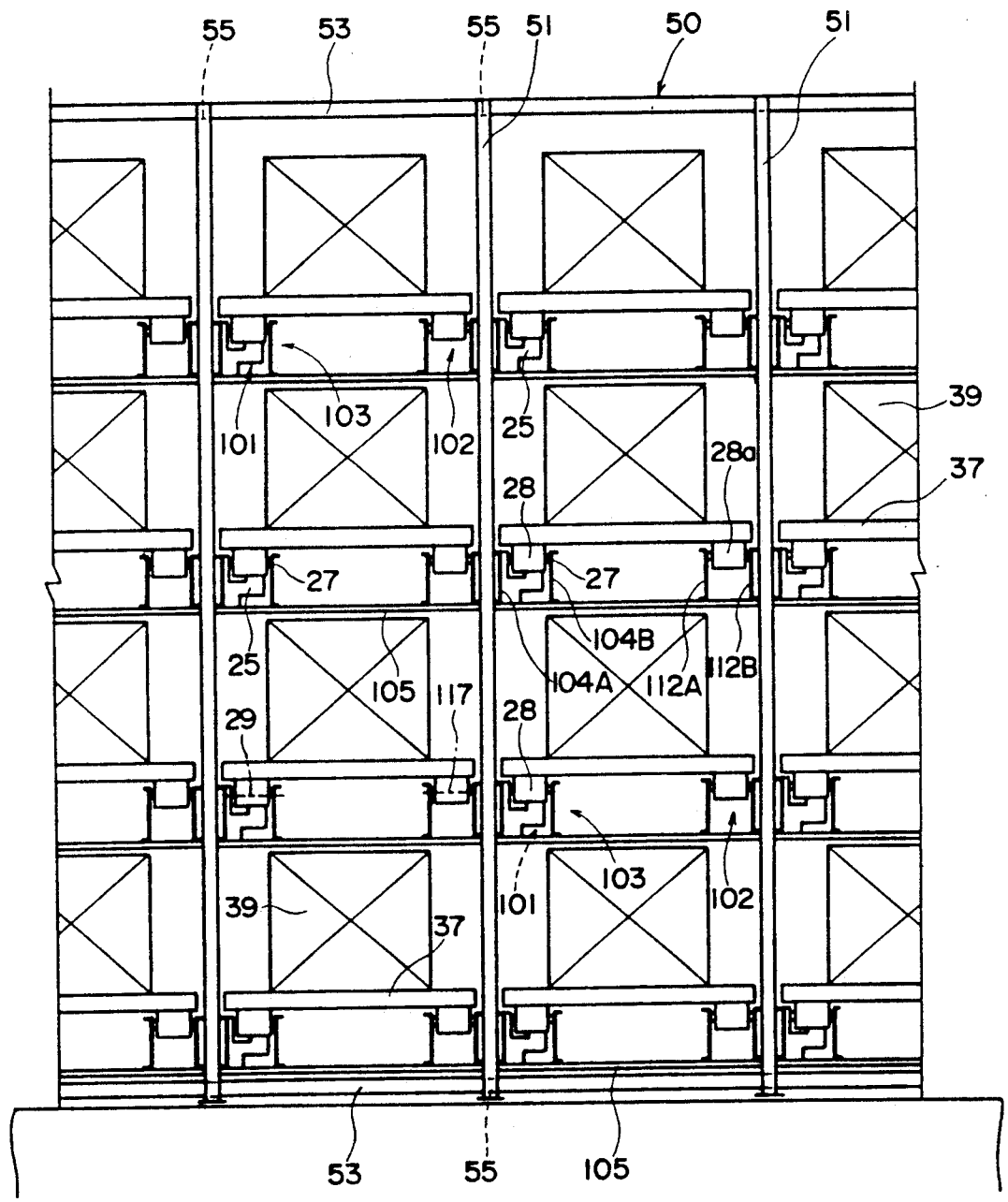
FIG. 28 is a front view of a shelf apparatus using rollers of a seventh embodiment of the invention.
Figure 29:
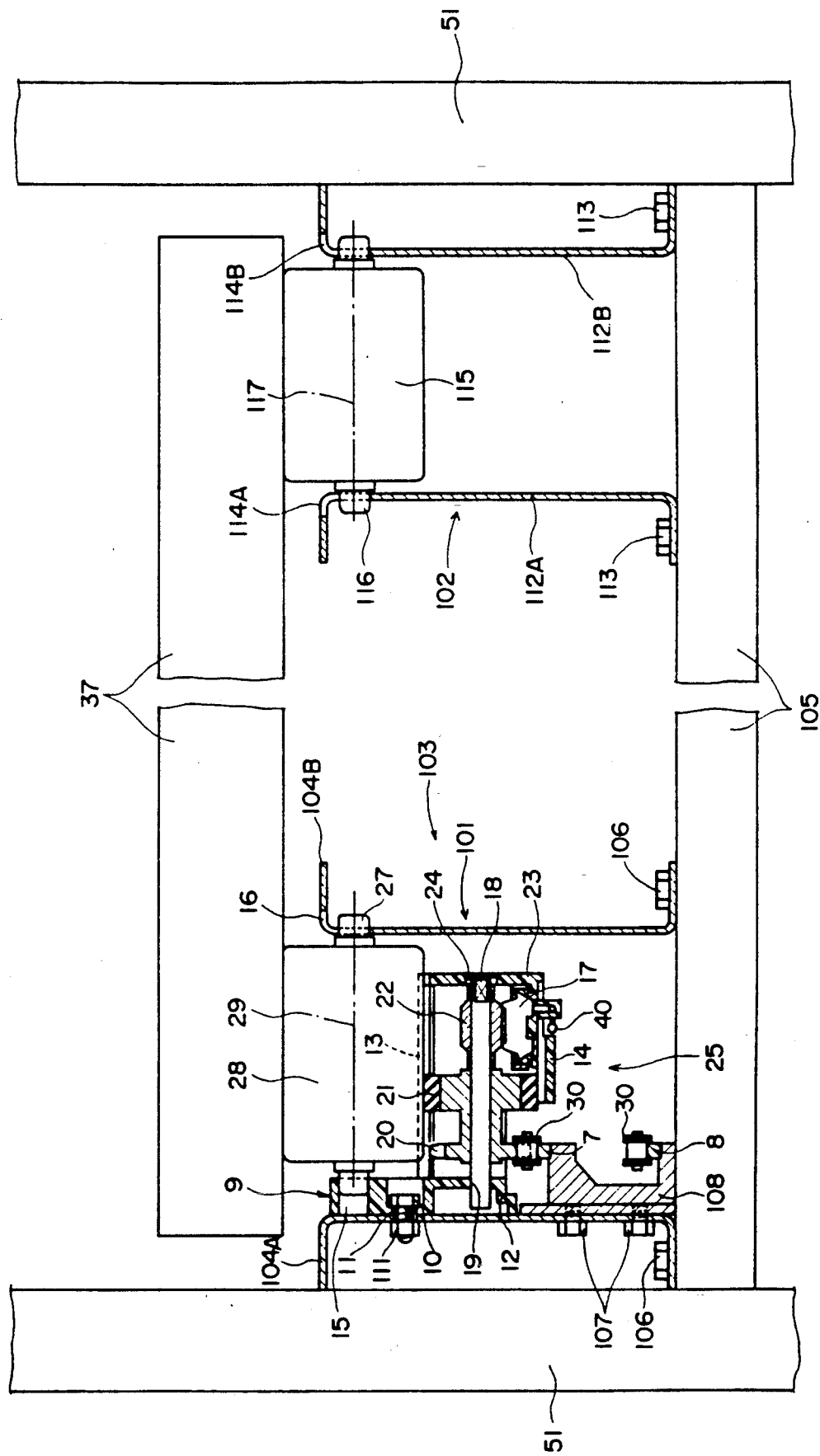
FIG. 29 is an enlarged front view, in section, showing the roller conveyor in the shelf apparatus of FIG. 28.
Figure 30:
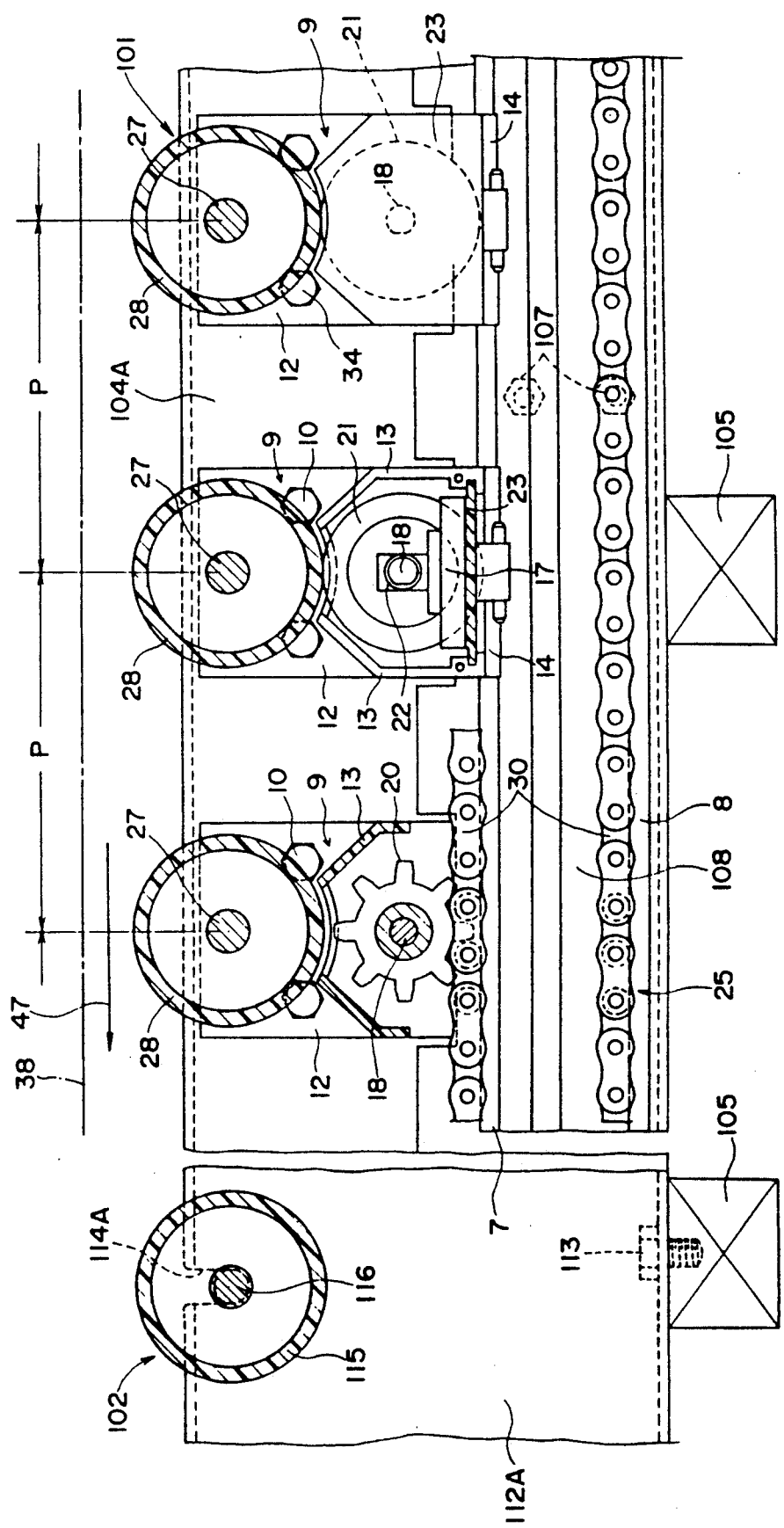
FIG. 30 is a side view, in section, of the roller conveyor of FIG. 29.

FIGS. 28 through 30 show a seventh embodiment of the invention. In this embodiment, as in the sixth embodiment, two rows of roller conveyors 101 and 102 constitute a transport device 103, one roller conveyor 101 incorporating driving devices 26.

More specifically, one roller conveyor 101 has a pair of channel-like main frames 104A and 104B fixed to a base frame 105 by fasteners 106 such as bolts, said base frame being installed between front pillars 51 and between rear pillars 52. One main frame 104 has a rail bracket 108 fixed the lower inner surface portion thereof by bolts 107, said rail bracket 108 having a pair of upper and lower guide rails 7 and 8 extending lengthwise of the frame. Further, a plurality of support frames 9 of resin are disposed on the upper inner surface portion of one main frame 104 and along the length of the main frame 104A. These support frames 9 are fixed in position by applying nuts 111 to bolts 10 inserted outwardly into attachment holes 11 formed in the respective intermediate regions. Each support frame 9 is in the form of a case comprising a base plate portion 12 formed with attachment holes 11, a pair of cover plate portions 13 extending from the lower half of said base plate portion 12 toward the main frame 104B, and a connecting plate portion 14 extending between the lower ends of said cover plate portions 13.

A through hole 15 is formed in the base plate portion 12 above said attachment holes 11. The upper corner of the other main frame 104B is formed with a top-opened engagement groove 16. A free roller 28 of resin is rotatably supported between the two main frames 104A and 104B through a roller shaft 27. More specifically, one end of the roller shaft 27 relatively rotatably inserted in the free roller 28 is inserted in the through-hole 15, the other end being dropped from above into the engagement groove 16 to complete the setting of the roller shaft 27; thus, the free roller 28 is rotatable around the roller axis 29. This free roller 38 is associated with a driving device 25.

The other roller conveyor 102 has a pair of main frames 12A and 112B, which are fixed on a base frame 105 by fasteners 113 such as bolts. The respective upper corners of these main frames 112A and 112B are formed with top-opened engagement grooves 114A and 114B. A non-driven type free roller 115 of resin is rotatably installed between the main frame 114A and 114B through a roller shaft 116. The opposite ends of the roller shaft 116 relatively rotatably inserted in the free roller 115 are dropped from above into the engagement grooves 114A and 115B to complete the setting of the roller shaft 116. The numeral 117 denotes the roller axis.

According to such arrangement, the rollers 28 are forcibly rotated by the driving devices 25 receiving power from the chain 30, whereby pallets 37 can be transported on the transport path 38. In this case, those free rollers 28 which have no pallets 37 arriving whereat and which, therefore, have no load acting thereon allow their roller shafts 27 to float at the other ends thereof in the engagement grooves 16; thus, those free rollers 28 do not strongly abut against the transmission rollers 21 Therefore, there is not so much power needed for driving whose free rollers 28 on Which no load is acting. When a pallet 27 arrives at such free roller 28. The load urges the free roller 28 against the transmission roller 21, whereby transmission of rotative power is sufficiently effected to ensure satisfactory transport based on forcible rotation.

During transport based on forcible rotation, the free rollers 115 of the other roller conveyor 102 make an accompanying rotation. Further, to prevent pallets 37 from moving sideways, the shelf frame 50 or the main frames 104A and 104B are provided with side guides (not shown) similar to those in the sixth embodiment.

In addition, the roller conveyors 60 and 61 shown in the first through sixth embodiments described above may be replaced by the roller conveyor 101 shown in FIG. 29.

Figure 31:
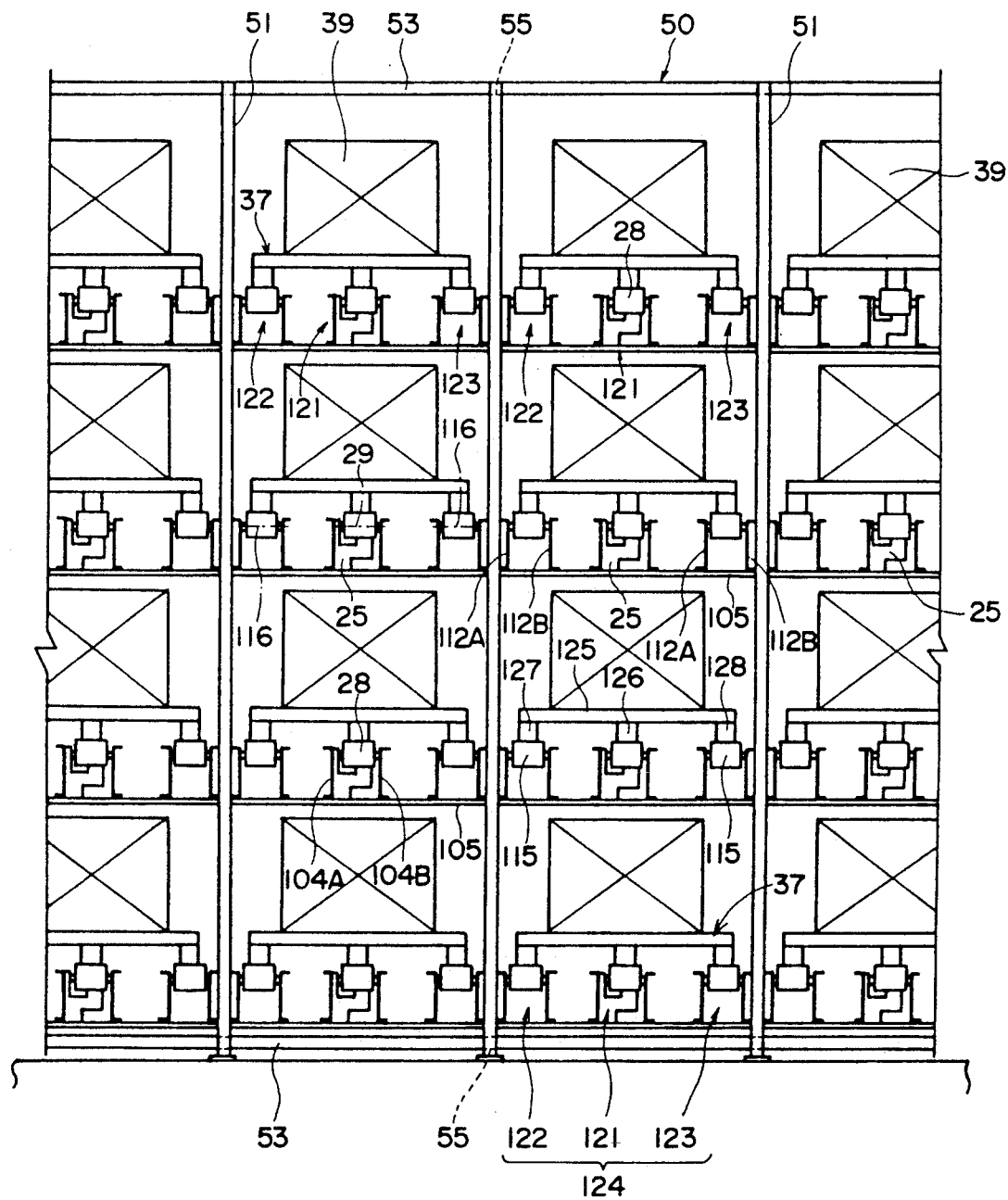
FIG. 31 is a front vie w of a shelf apparatus using rollers of an eighth embodiment of the invention.
Figure 32:
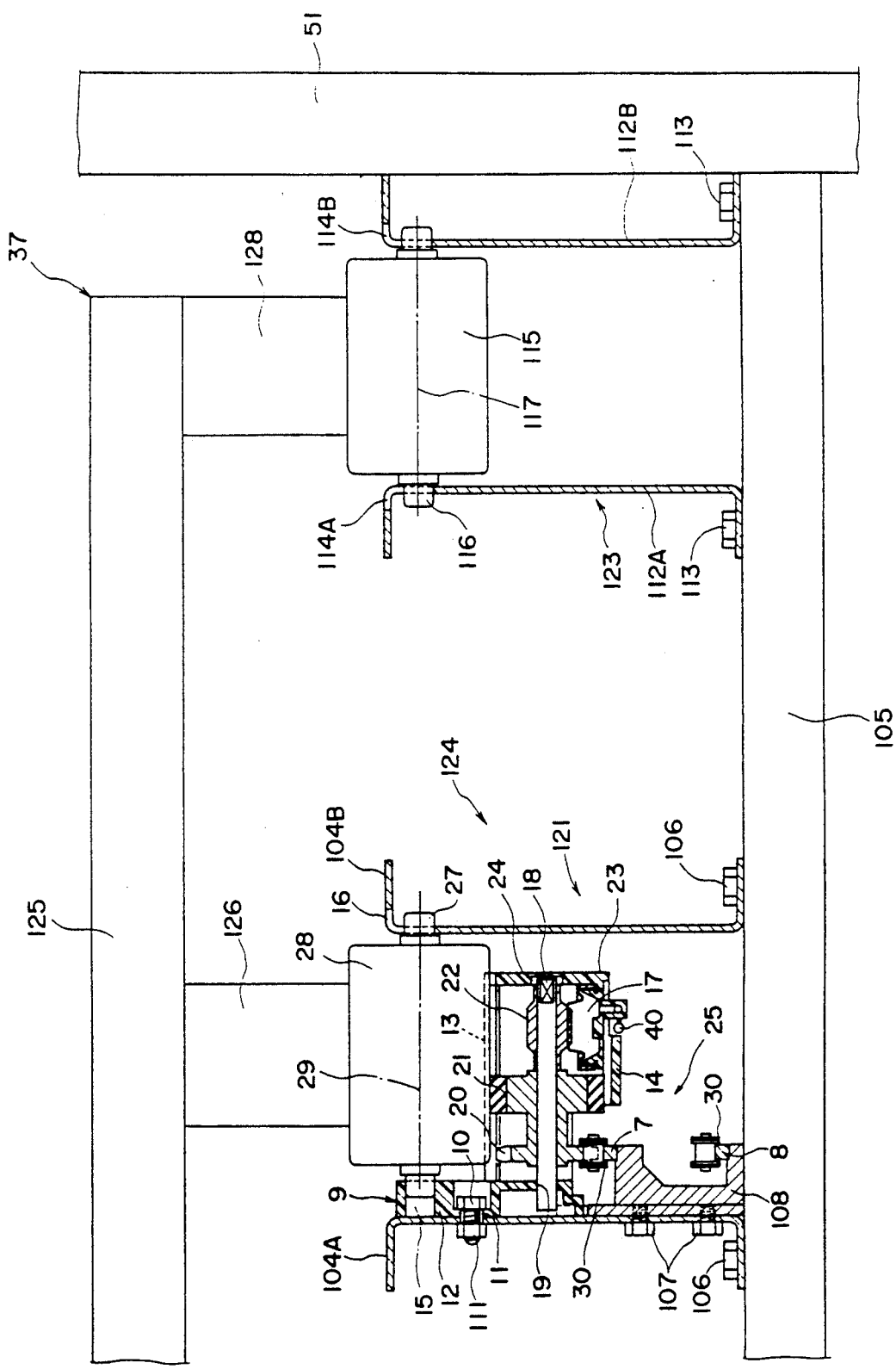
FIG. 32 is an enlarged front view, in section, showing the roller conveyor in the shelf apparatus of FIG. 31.

FIGS. 31 and 32 show an eighth embodiment of the invention. In this embodiment, three rows of roller conveyors 121, 122 and 123 constitute a transport path 124, the middle roller conveyor 121 being provided with driving devices 25. The middle driven type roller conveyor 121 has the same construction as that of one roller conveyor 101 in the seventh embodiment, while the non-driven type roller conveyors 122 and 123 on the opposite sides have the same construction as that of the other roller conveyor 102 in the seventh embodiment.

According to such arrangement, if a pallet 37 comprising a load support plate 125 and three legs 126, 127 and 128 is used, the middle leg 126 can be supported on the middle roller conveyor while the legs 127 and 128 on the opposite sides can be supported on the roller conveyors 122 and 123 on the opposite sides. Thus, even such pallet 37, which has three legs 126, 127 and 128, can be stably and reliably transported. In addition, usual flat pallets 37 used in the other embodiments can also be likewise transported by the three roller conveyor 121, 122 and 123.

Figure 33:
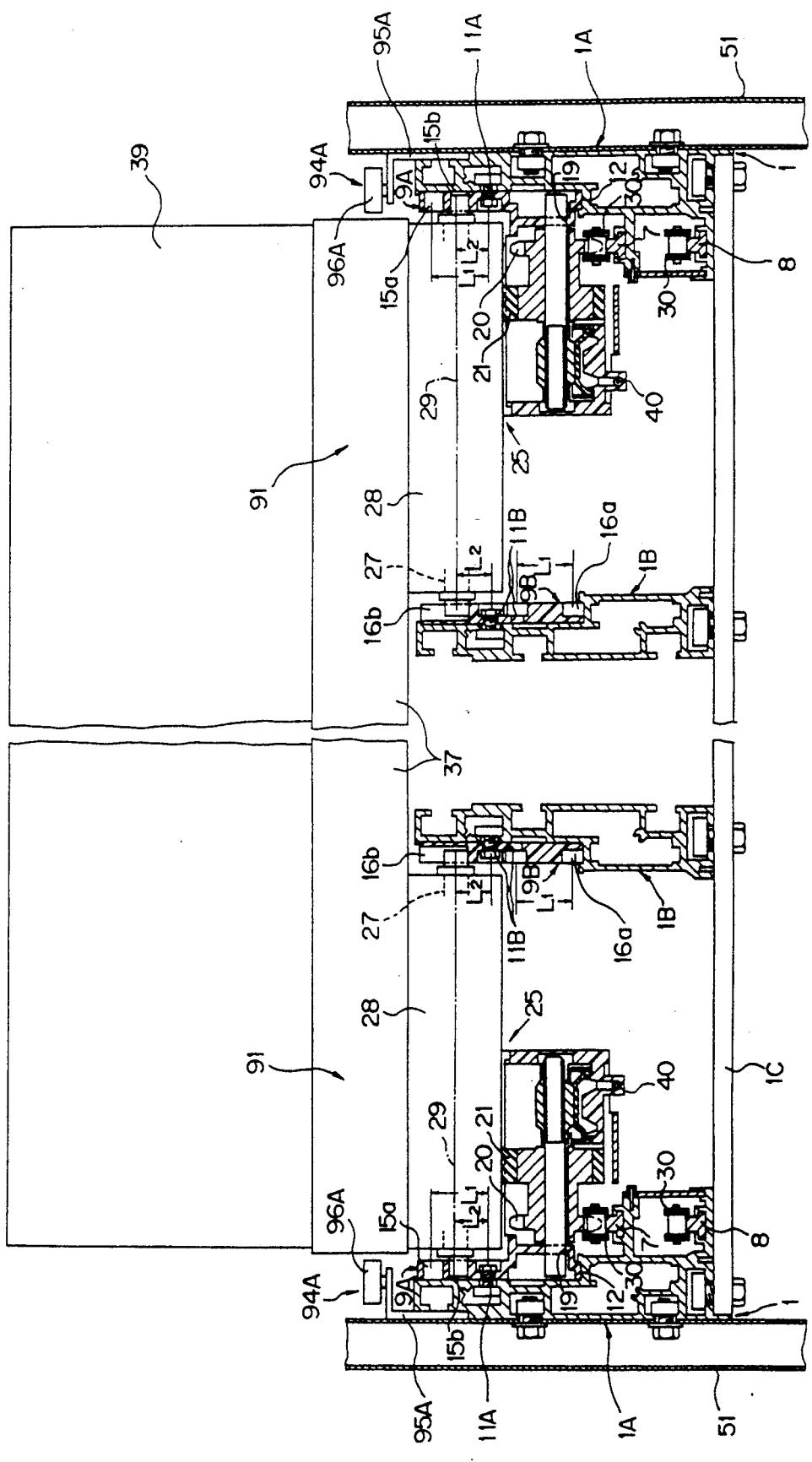
FIG. 33 is a front view, in section, of roller conveyors in a shelf apparatus using rollers according to a ninth embodiment of the invention.

FIG. 33 shows a ninth embodiment of the invention. In the sixth embodiment shown in FIGS. 26 and 27, of the two roller conveyors forming the transport device 103, one conveyor 91 alone has been associated with the driving device 25. However, in this ninth embodiment, each of the roller conveyors 91 is associated with a driving device 25.

According to such arrangement, pallets 37 can be prevented more reliably than in the sixth embodiment from making a sinuous movement. Further, according to the sixth and ninth embodiments, a space can be defined below the pallets 37 between the roller conveyors 91 and 92 and between the roller conveyors 91 to make room for installing stops or the like adapted to stop the movement of pallets 37 or operating the fork of a fork lift truck for putting pallets 37 on and out to the shelves.

Figure 34:
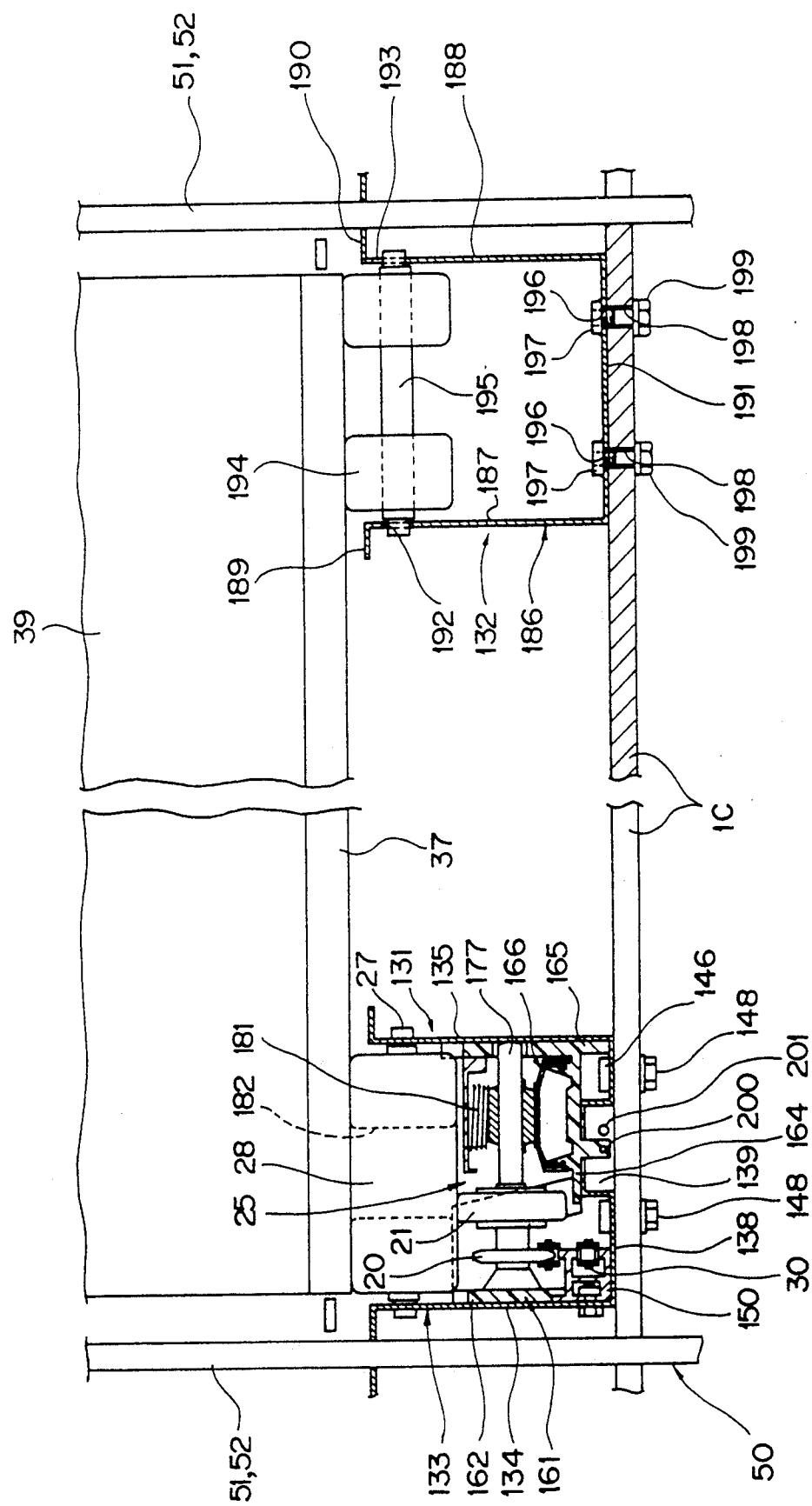
FIG. 34 is a front view, in section, of roller conveyors in a shelf apparatus using rollers according to a tenth embodiment of the invention.
Figure 35:
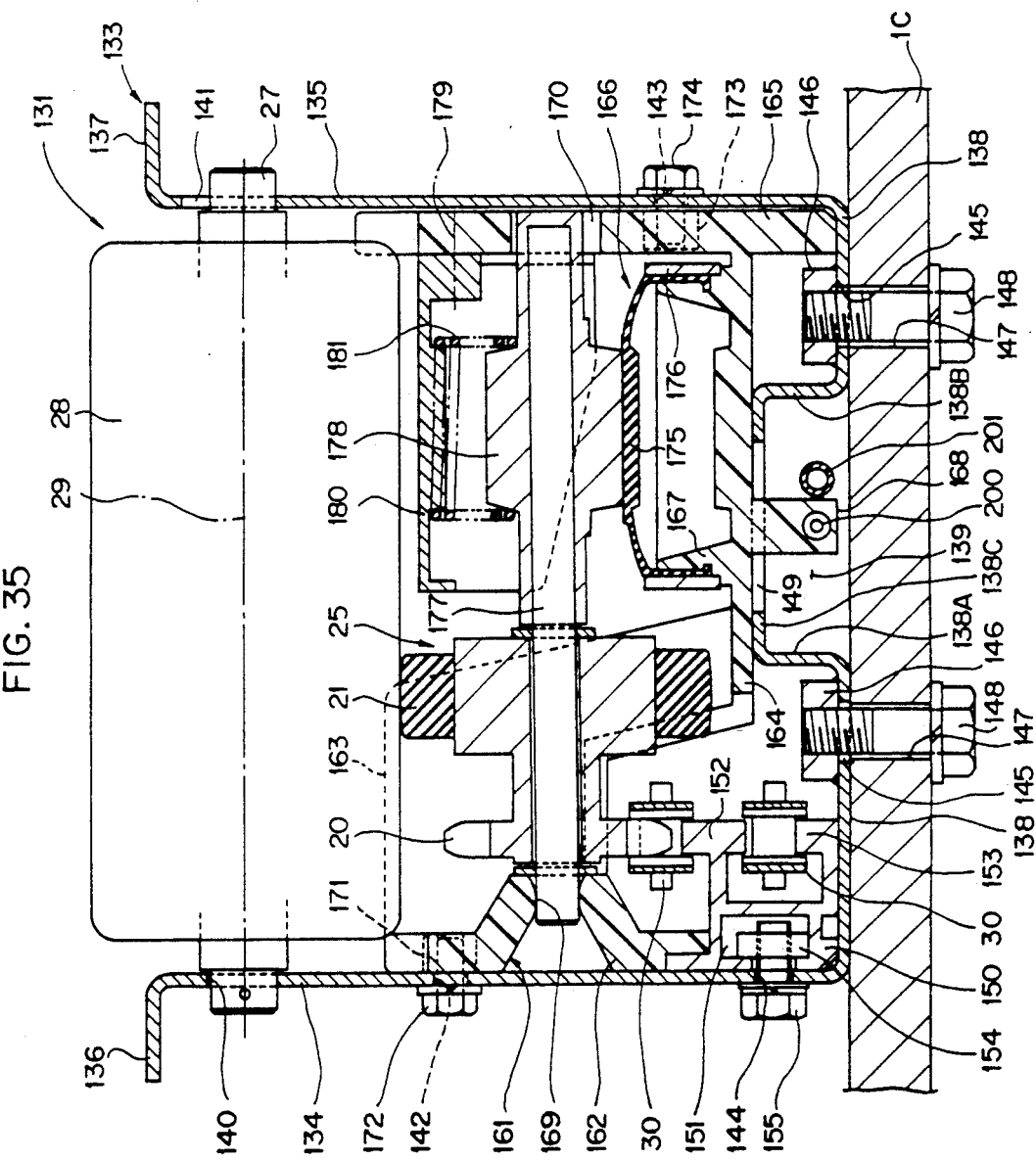
FIG. 35 is an enlarged front view, in section, showing a roller conveyor of FIG. 34 capable of generating driving power.
Figure 36:
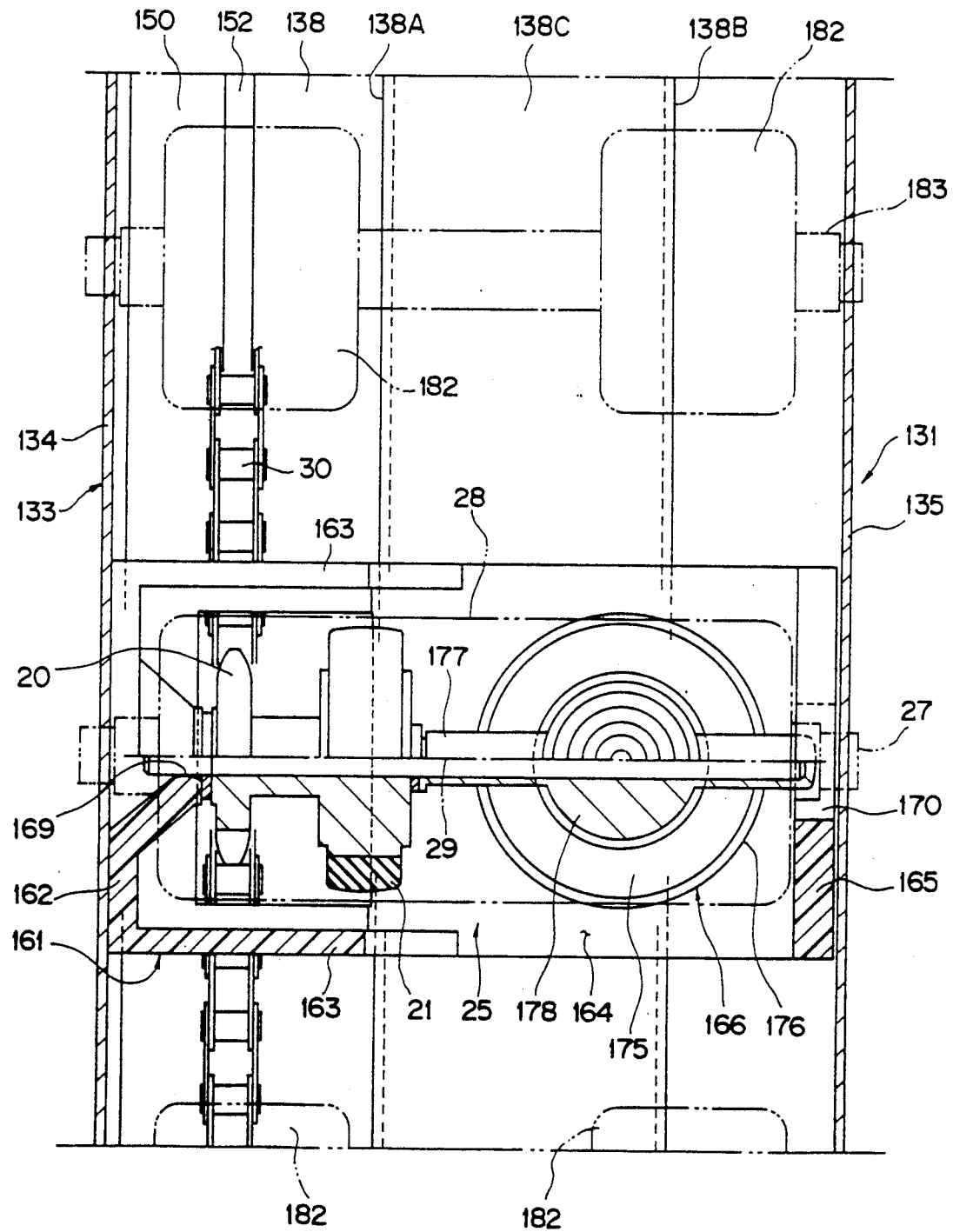
FIG. 36 is a plan view, in section, of the roller conveyor shown in FIG. 35.

FIGS. 34 through 36 show a tenth embodiment of the invention. In this tenth embodiment, two conveyors 131 and 132 are provided. A conveyor frame 133 in one conveyor is is U-shaped in cross-section, formed of a pair of lateral plates 134 and 135, upper plates 136 and 137 bent outward from the upper ends of the lateral plates 134 and 135, and a bottom plate 138 connecting the lower ends of the lateral plates 134 and 135. The bottom plate 138 is formed at the middle of its width with a raised portion 135 defined by upright portions 138A and 138B and extending throughout the length thereof.

The lateral plates 134 and 135 are formed at their upper portions with a plurality of shaft holes 140 and 141 for attaching a roller 28 and at their intermediate portions with a plurality of bolt holes 142 and 143 for fixing a driving device 23, said shaft holes and bolt holes being respectively disposed at a predetermined pitch as viewed in the direction of the length. One lateral plate 134 is formed at its lower portion with bolt holes 144 for fixing a guide rail 150. The conveyor frame 133 thus formed is removably attached to the shelf frame 50. To this end, the bottom plate 138 is formed with bolt holes 145, and nuts 146 aligned with said bolt holes 145 are attached to the bottom plate 138 within the conveyor frame 133. And bolts 148 inserted from below into through holes 147 formed in the base frame 1C are screwed into the nuts 146 through the bolt holes 145. The upper plate 138C is formed with a through hole 149 for piping to the driving device 25. The roller 28 or resin is attached to the conveyor frame 133 by inserting its roller shaft 27 into shaft holes 140 and 141 and is free to rotate around the roller axis 29.

The guide rail 150 is installed at one corner of the bottom inside the conveyor frame 133 and has a dovetail mortise 151 in the outer side and a pair of vertically spaced guides 152 in the inner side for a chain 30. A plate like nut 154 is slidably fitted in the dovetail mortise 151, and a bolt 188 inserted is into the nut 154 from outside through the bolt hole 144 and tightened, thereby fixing the guide rail 150 to the conveyor frame 133.

The driving device 25 used in this embodiment will now be described. A support frame 161 of resin comprises one support plate 162 adapted to abut against the inner surface of one lateral plate 134 and adapted to be fitted on the upper portion of the guide rail 150, a pair of cover plates 163 extending from the front and rear ends of said one support plate 162 toward the other lateral plate 135, a holder plate 164 connecting the lower ends of said cover plates 163 and extending toward the other lateral plate 135, and the other support plate 165 integrated with the other end of said holder plate 164 and adapted to be applied to the inner surface of the other lateral plate 135. The holder plate 164 is mountable on the upper plate 138C, and the upper portion of the holder plate 164 is integrally formed with the main body 167 of a cylinder device 166 which is an actuator utilizing fluid. A piping holder 16B extends downward from the lower portion of the holder plate 164 through the through-hole 168 into the recess 138. The central portion of one support plate 162 is formed with a bearing hole 169 and the other support plate 165 is formed with a loose-fit hole 170 opposed to said bearing hole. Above the bearing hole 169, a nut 171 is embedded in and fixed to one support plate 162. The bolt 172 inserted from outside into the bolt hole 142 is tightened, whereby one support plate 162 is fixed to one lateral plate 134. Below the loose-fit hole, 170, a nut 173 is embedded is and fixed to the other support plate 165, and the bolt 174 inserted from outside into the bolt hole 143 is tightened, whereby the other support plate 165 is fixed to the other lateral plate 135.

The cylinder device 188 is constructed by fitting an expansible rubber body 175 from above on the main body 167 and fixing it as by a band 176. A support shaft 177 approximately parallel with the roller axis 29 is fitted at one end thereof in the bearing hole 169 and at the other end in the loose-fit hole 170, so that said support shaft is vertically swingable within a given range around its portion received in the bearing hole 169. A cylinder rubber holder 178 attached to the other side of the support shaft 177 is pressed from above against the rubber body 175; thus, the transmission roller 21 can be moved into contact with and away from the free roller 28 by the action of the cylinder device 166. On the other hand, a presser plate 180 is connected to the upper end of the other support plate 165 and extends therefrom to one side, and a compression spring 181, which is an example of means for pressing the support shaft 177 downward, is interposed between the lower surface of the presser plate 180 and the upper surface of the cylinder rubber holder 178.

Paris each consisting of a free roller 28 and a driving device 25 are arranged at every other roller pitch position, with a pair of free rollers is arranged between the free rollers 28 through roller shafts 183.

The conveyor frame 186 in the other conveyor 132, as shown in FIG. 34, is U-shaped in cross section, defined by a pair of lateral plates 187 and 188, upper plates 189 and 190 outwardly bent from the upper ends of said lateral plates 187 and 188, and a bottom plate 191 connecting the lower ends of said lateral plates 187 and 188. The upper portions of the lateral plates 187 and 188 are formed with shaft holes 192 and 193, and a roller shaft 195 having a pair of free rollers 194 attached thereto is inserted into the shaft holes 102. The conveyor frame 186 thus formed is removably fixed to the shelf frame 50. To this end, the bottom plate 191 is formed with bolt holes 196, while nuts 197 aligned with said bolt holes 196 are fixed on the bottom plate 191 within the conveyor frame 186. And bolts 199 inserted from below into through-holes 198 formed in the base frame 1C are screwed into the nuts 197 through the bolt holes 196.

In the above arrangement, each of the conveyor frames 133 and 186 has the free roller 28, guide rail 150, driving device 25 and free rollers 182 and 194 built therein, and also has hoses 200 and 201 installed in the recess 139 to drive the cylinder device 166; these are transported to the site for the installation of the shelf apparatus During or after the assembling of the shelf frame 50, the conveyors 131 and 132 are attached to the shelf frame 50. This is effected by aligning the bolt holes 148 and 191 with the through-holes 147 and 198, and screwing the bolts 148 and 199 inserted from below into the through holes 147 and 198 into the nuts 146 and 197 and tightening said bolts. If the transfer path is long, the conveyors 131 and 132 are respectively connected together. However, the chain 30 and the like are used in common.

Since the conveyors 131 and 132 are respectively utilized for their respective conveyor frames 133 and 186, the transport to the site for installation and assembling operation are easy. Therefore, the assembling of the shelf apparatus and repair of the conveyors 131 and 132 are easy.

Figure 37:
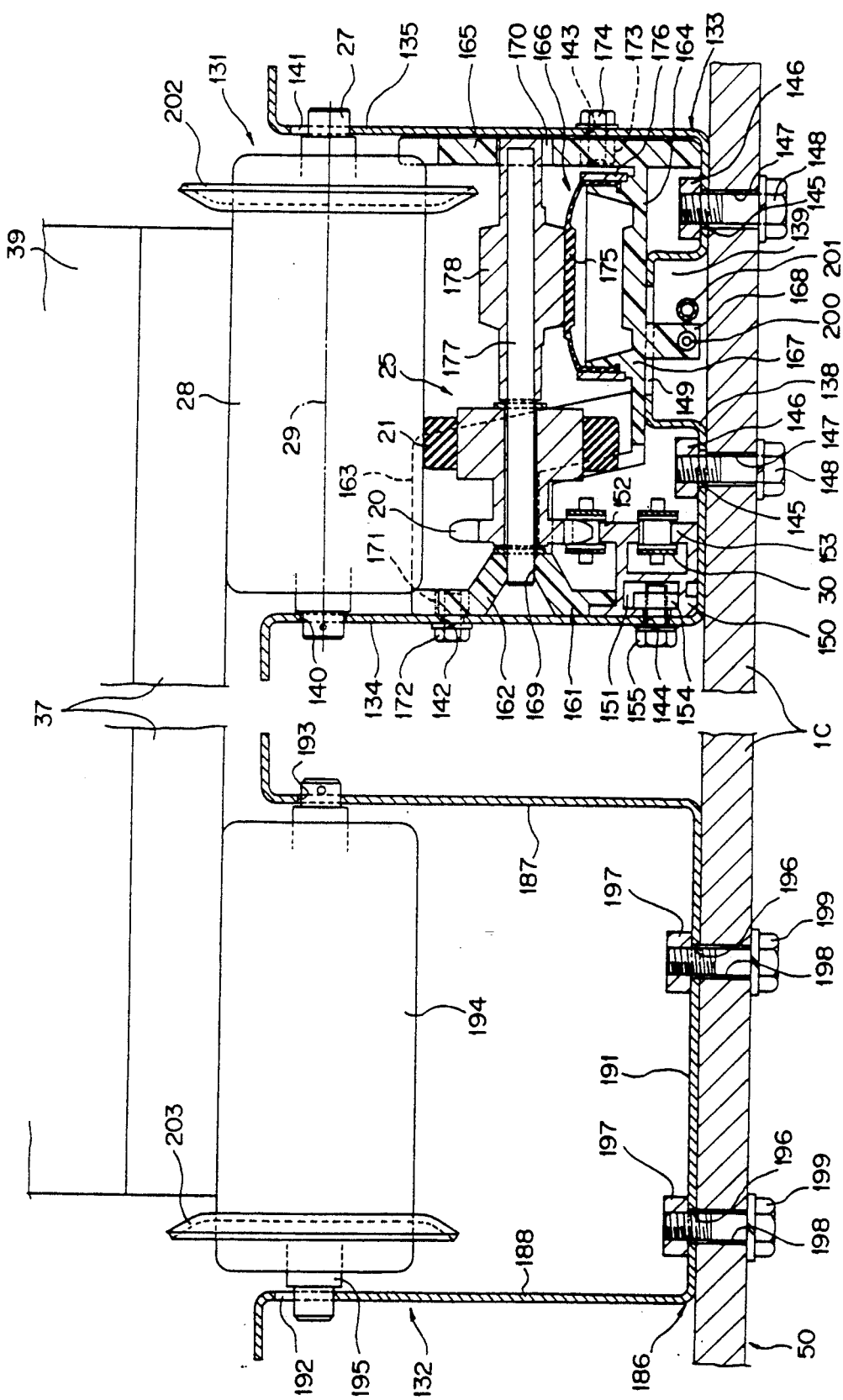
FIG. 37 is a front view, in section, of roller conveyors in a shelf apparatus using rollers according to an eleventh embodiment of the invention.
Figure 38:
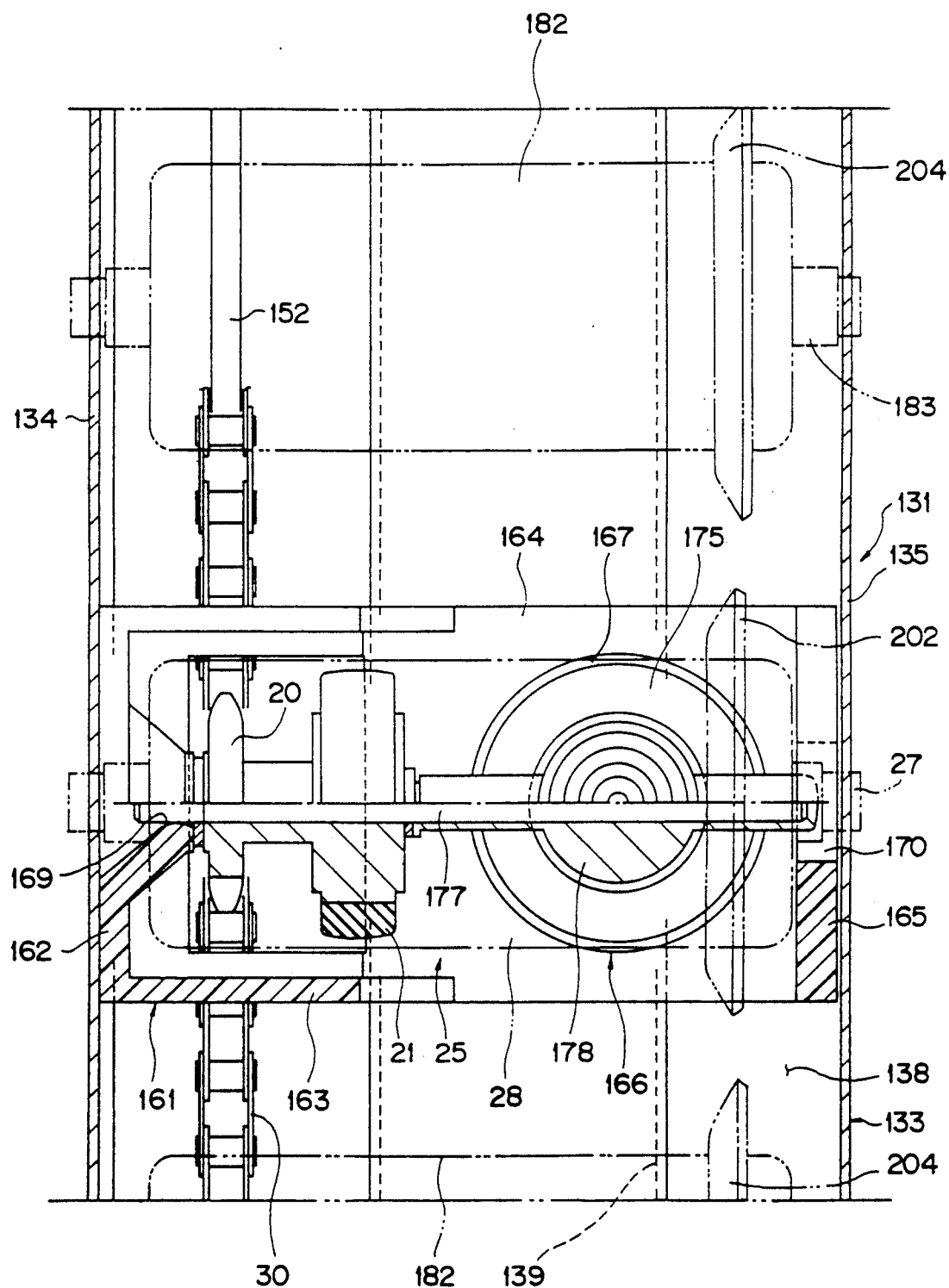
FIG. 38 is an enlarged plan view, in section, showing a roller conveyor of FIG. 37 capable of generating driving power.

FIGS. 37 and 38 show an eleventh embodiment of the invention. This eleventh embodiment has approximately the same arrangement as that of the tenth embodiment (FIGS. 34 through 36) described previously. The difference from the tenth embodiment is that annular flanges 202, 203 and 204 are attached to the outer peripheries of the free roller 28, 182 and 194 at positions outside the pallet 37. These flanges 202, 203 and 204 have their peripheral edge inclined upwardly outward with respect to the pallet 87. The free rollers 182 and 194 are longitudinally continuous, in contrast to the tenth embodiment in Which they are separated to provide pairs.

According to such arrangement, since the pallet 37 is positioned between the flanges 202 and 203 in one conveyor 131 and the flange 204 in the other conveyor 132, if it is forced to deviate to one side during transport, it will be received by these flanges 202, 203 and 204 and thereby prevented from slipping off the rollers. Furthermore, since the flanges 202, 203 and 204 are rotated integrally with the rollers 28, 182 and 194, there is almost no slippage between the flanges 202, 203 and 204 and the pallet 37 which abuts against the flanges 202, 203 and 204 and which is thereby prevented from deviating to one side. Thus, smooth transport without involving any damage or frictional resistance can be attained. Further, the flanges 202, 203 and 204 can be easily attached to the rollers 28, 182 and 194.

What is claimed is:

1. A shelf apparatus using rollers, comprising
   a shelf frame,
   conveyor means disposed in a plurality of vertically spaced stages within said shelf frame, each of said conveyor means defining a horizontal plane and having two rows of roller conveyors defining a conveying path upon which loads are transported at least one of said two rows of roller conveyors being capable of exerting feed force to the loads along said conveyor means,
   a plurality of free rollers arranged for idle rotation along a conveying path and included in each of said two rows of roller conveyors, and
   driving means by which said at least one of said two rows of roller conveyors capable of exerting feed force to the loads along said conveyor means is adapted to come in frictional engagement and break frictional engagement with said free rollers and subject said free rollers to forced revolution as long as the frictional engagement is maintained.

2. A shelf apparatus using rollers as set forth in claim 1, wherein said driving means effects operative engagement to and disengagement from the free rollers by using working fluid.

3. A shelf apparatus using rollers as set forth in claim 1, wherein each free roller is supported in a conveyor frame of U-shaped cross section, said conveyor frame being removably fixed to the shelf frame.

4. A shelf apparatus using rollers as set forth in claim 3, wherein said driving means is installed within the conveyor frame.

5. A shelf apparatus using rollers as set forth in claim 4, wherein said at least one of said two rows of rollers conveyors has free rollers operatively connectable to said driving means, and free roller not operatively connected to the driving means.

6. A shelf apparatus using rollers as set forth in claim 3, wherein the conveyor frame has a pair of lateral plates, and a bottom plate connecting the lower ends of said lateral plates, said bottom plate being formed with an upward recess on the outer side of the central portion thereof.

7. A shelf apparatus using rollers as set forth in claim 1, wherein annular flanges adapted to prevent loads from deviating sideways are attached to the outer peripheries of the free rollers at positions outside the load.

8. A shelf apparatus using rollers as set forth in claim 7, wherein said flanges have their peripheral edges inclined upwardly outward with respect to the load.

* * * * *